(12) United States Patent
Lee et al.

(10) Patent No.: US 8,526,538 B2
(45) Date of Patent: Sep. 3, 2013

(54) UPLINK PRECODING METHOD IN 4-TX SYSTEM

(75) Inventors: Moon II Lee, Gyeonggi-do (KR); Wook Bong Lee, Gyeonggi-do (KR); Jae Hoon Chung, Gyeonggi-do (KR); Hyun Soo Ko, Gyeonggi-do (KR); Bin Chul Ihm, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 803 days.

(21) Appl. No.: 12/704,483

(22) Filed: Feb. 11, 2010

(65) Prior Publication Data

US 2010/0208838 A1 Aug. 19, 2010

Related U.S. Application Data

(60) Provisional application No. 61/152,476, filed on Feb. 13, 2009, provisional application No. 61/153,943, filed on Feb. 19, 2009, provisional application No. 61/156,544, filed on Mar. 2, 2009, provisional application No. 61/163,056, filed on Mar. 25, 2009, provisional application No. 61/171,071, filed on Apr. 20, 2009, provisional application No. 61/176,094, filed on May 6, 2009, provisional application No. 61/218,437, filed on Jun. 19, 2009.

(30) Foreign Application Priority Data

Dec. 21, 2009 (KR) .................. 10-2009-0127920

(51) Int. Cl.
*H04L 27/00* (2006.01)

(52) U.S. Cl.
USPC ........................................... 375/299

(58) Field of Classification Search
USPC ................. 375/299, 260, 267, 296, 295, 316, 375/349; 455/137, 556.1, 562.1; 341/67, 341/106
See application file for complete search history.

(56) References Cited

U.S. PATENT DOCUMENTS

| | | | |
|---|---|---|---|
| 2008/0043865 A1 | 2/2008 | Kim et al. | |
| 2008/0101322 A1 | 5/2008 | Prakash et al. | |

(Continued)

FOREIGN PATENT DOCUMENTS

| | | |
|---|---|---|
| CN | 101159464 | 4/2008 |
| CN | 101272364 | 9/2008 |

(Continued)

OTHER PUBLICATIONS

LG Electronics, "Codebook Design and Evaluation for E-ULTRA MIMO Precoding —4Tx Rank Adaptation Scheme," R1-070914, 3GPP TSG RAN WG1 Meeting #48, Feb. 2007, 9 pages.

(Continued)

*Primary Examiner* — Khai Tran
(74) *Attorney, Agent, or Firm* — Lee, Hong, Degerman, Kang & Waimey

(57) ABSTRACT

A method for a user equipment to precode and transmit an uplink signal efficiently in a 4-antenna system and a method for a base station to receive the transmitted signal efficiently are disclosed. Four antennas of a user equipment can be grouped by a 2-antenna unit. In consideration of this antenna group, it is able to perform precoding using antenna selection/ DFT matrix of the antenna group unit. Moreover, a rank-3 codebook can be configured to include a precoding matrix of a type in consideration of power balance per antenna and a precoding matrix including one non-zero component only in one row for maintaining a good CM property.

21 Claims, 5 Drawing Sheets

(56) References Cited

U.S. PATENT DOCUMENTS

| | | | |
|---|---|---|---|
| 2008/0303699 A1 | 12/2008 | Zhang et al. | |
| 2010/0034308 A1* | 2/2010 | Kim et al. | 375/267 |
| 2010/0061477 A1* | 3/2010 | Lee et al. | 375/267 |
| 2010/0150266 A1* | 6/2010 | Mondal et al. | 375/296 |
| 2010/0220801 A1* | 9/2010 | Lee et al. | 375/267 |

FOREIGN PATENT DOCUMENTS

| | | |
|---|---|---|
| CN | 101273599 | 9/2008 |
| CN | 101340219 | 1/2009 |
| WO | 2008124535 | 10/2008 |

OTHER PUBLICATIONS

LG Electronics, "Uplink MIMO Transmission for LTE-Advanced," R1-090217, 3GPP TSG RAN WG1 Meeting #55bis, Jan. 2009, 7 pages.

Taiwan Intellectual Property Office Application Serial No. 099104870, Office Action dated Jan. 14, 2013, 4 pages.

The State Intellectual Property Office of the People's Republic of China Application Serial No. 201080007943.7, Office Action dated Jul. 1, 2013, 5 pages.

* cited by examiner

ULA setup

X - pol setup

UPLINK PRECODING METHOD IN 4-TX SYSTEM

CROSS REFERENCE TO RELATED APPLICATIONS

Pursuant to 35 U.S.C. 119, this application claims the benefit of earlier filing date and right of priority to Korean Patent Application No. 10-2009-0127920, filed on Dec. 21, 2009, and also claims the benefit of U.S. Provisional Application Nos. 61/152,476, 61/153,943, 61/156,544, 61/163,056, 61/171,071, 61/176,094 and 61/218,437, filed on Feb. 13, 2009, Feb. 19, 2009, Mar. 2, 2009, Mar. 25, 2009, Apr. 20, 2009, May 6, 2009 and Jun. 19, 2009, respectively, the contents of which are all hereby incorporated by reference herein in their entirety.

BACKGROUND OF THE INVENTION

1. Field of the Invention

The present invention relates to a technology for transmitting/receiving signals through precoding in a mobile communication system, and more particularly, to a method for a user equipment to precode and transmit an uplink signal efficiently in a 4-antenna system and a method for a base station to receive the transmitted signal efficiently.

2. Discussion of the Related Art

In a multi-antenna or MIMO system, precoding provides high peak/average system throughput by providing a beamforming gain and a diversity gain to a transmitting/receiving side. Yet, a precoding scheme needs to be appropriately designed in consideration of antenna setting, channel configuration, system structure and the like.

Generally, an MIMO system performs precoding to minimize complexity and control signaling overhead using a codebook based precoding scheme. In this case, a codebook includes a scribed number of precoding vectors/matrixes predetermined between transmitting and receiving sides according to a transmission rank and the number of antennas. The transmitting side selects a specific vector/matrix within the codebook according to channel status information received from the receiving side, perform precoding on a transmission signal, and then transmits the precoded signal. Occasionally, the transmitting side selects a precoding matrix according to a predetermined rule instead of receiving the channel status information from the receiving side, performs precoding and is then able to transmit a corresponding signal.

FIG. 1 is a diagram for explaining a basic concept of codebook based precoding.

According to a codebook based precoding scheme, as mentioned in the foregoing description, a transmitting side and a receiving side share codebook information including a prescribed number of precoding matrixes predetermined according to a transmission rank, the number of antennas and the like with each other. The receiving side measures a channel status via a received signal and is then able to feed back preferred precoding matrix information to the transmitting side based on the aforesaid codebook information. FIG. 1 shows that the receiving side transmits preferred precoding matrix information per codeword to the transmitting side, for example.

Having received the feedback information from the receiving side, the transmitting side is able to select a specific precoding matrix from the codebook based on the received information. Having selected the precoding matrix, the transmitting side performs precoding in a manner of multiplying layer signals, of which number corresponds to a transmission rank, by the selected precoding matrix. And, the transmitting side is able to transmit the precoded transmission signal via a plurality of antennas. Having received the signal precoded and transmitted by the transmitting side, the receiving side is able to reconstruct the received signal by performing a process reverse to the precoding performed by the transmitting side. As a precoding matrix generally meets such a condition of a unitary matrix (U) as $U*U^H=I$, the reverse processing of the above precoding can be performed in a manner of multiplying a received signal by Hermitian ($P^H$) of a precoding matrix (P) used for the precoding of the transmitting side.

In LTE ($3^{RD}$ Generation Partnership Project Long Term Evolution) release 8 system, in case of applying MIMO scheme to an uplink signal transmission to a base station from a user equipment, an MIMO transmission scheme is prescribed for a downlink signal transmission from a base station to a user equipment only due to such a problem as PAPR/CM (peak-to-average ratio/cubic metric) property degradation and the like. Yet, an uplink signal transmitted by a user equipment to a base station is ongoing to be discussed in a direction of applying MIMO scheme for transmission rate increase, diversity gain acquisition and the like. And, a next standard of 3GPP LTE system is ongoing to discuss about a detailed method of applying MIMO scheme to an uplink signal transmission.

SUMMARY OF THE INVENTION

Accordingly, the present invention is directed to an uplink precoding method in 4 Tx system that substantially obviates one or more problems due to limitations and disadvantages of the related art.

An object of the present invention is to provide a codebook for uplink precoding, and more particularly, a codebook suitable for a user equipment to precode and transmit a signal efficiently using 4 antennas.

Another object of the present invention is to provide a method of transmitting a signal to a base station from a user equipment using 4 antennas.

The technical objects realized and attained by the present invention are non-limited to the above mentioned objects. And, other unmentioned technical tasks can be taken into consideration by those having ordinary skill in the art, to which the present invention pertains, upon examination of the following embodiments of the present invention.

To achieve these objects and other advantages and in accordance with the purpose of the invention, as embodied and broadly described herein, a method of transmitting a signal, which is transmitted to a base station by a user equipment configured to use 4 antennas, according to the present invention includes the steps of obtaining transmission rank information, outputting a precoded signal by selecting one precoding matrix corresponding to the transmission rank from a 4-antenna codebook and then performing precoding on layer signals of which number corresponds to the transmission rank, and transmitting the precoded signal to the base station, wherein the 4 antennas are grouped into a first antenna group including two of the 4 antennas and a second antenna group including the rest of the 4 antennas and wherein the 4-antenna codebook includes a first type precoding matrix, in which two components corresponding to the first antenna group are zero and two components corresponding to the second antenna group construct a DFT matrix, and a second type precoding matrix, in which two components corresponding to the first antenna group and two components corresponding to the second antenna group construct DFT matrixes, respectively, for a rank 1.

Preferably, the first type precoding matrix is an antenna group selection matrix and wherein the second type precoding matrix is a DFT matrix.

Preferably, the second type precoding matrix includes a code in which the two components corresponding to the first antenna group and the two components corresponding to the second antenna group are mutually orthogonal.

Preferably, the 4-antenna codebook includes a precoding matrix, in which two components corresponding to either the first antenna group or the second antenna group are 0 in a first column and two components corresponding to either the second antenna group or the first antenna group are 0 in a second column, for a rank 2.

More preferably, the 4-antenna codebook includes at least one selected from the group consisting of a precoding matrix for performing a layer swapping function of changing positions of two layer signals and an antenna permutation precoding matrix for changing a position of an antenna, for the rank 2.

In another aspect of the present invention, a method of transmitting a signal, which is transmitted to a base station by a user equipment using 4 antennas, includes the steps of obtaining transmission rank information, outputting a precoded signal by selecting one precoding matrix corresponding to the transmission rank from a 4-antenna codebook including a first type precoding matrix of 4*3 matrix type including 2 non-zero components in each row for a rank 3 and 2 zero components in first and second columns and then performing precoding on layer signals of which number corresponds to the transmission rank and transmitting the precoded signal to the base station.

Preferably, the first type precoding matrix has a type of $$W_{N_t \times 3}^n = \begin{bmatrix} \bar{v}_i & \bar{z} & \bar{v}_k \\ \bar{z} & \bar{v}_j & \bar{v}_l \end{bmatrix},$$

$\bar{v}_i$, $\bar{v}_k$, $\bar{v}_j$ and $\bar{v}_l$ are 2*1 vectors including non-zero components only, and $\bar{z}$ is 2*1 vector including zero components only.

More preferably, the $\bar{v}_i$ and the $\bar{v}_k$ are mutually orthogonal and the $\bar{v}_j$ and the $\bar{v}_l$ are mutually orthogonal. In this case, if a normalization coefficient for the $\bar{v}_i$ and the $\bar{v}_j$ is set to $1/\sqrt{\alpha}$ and a normalization coefficient for the $\bar{v}_k$ and the $\bar{v}_l$ is set to $1/\sqrt{\beta}$, it meets $\alpha=2\beta$. If a normalization coefficient for the $\bar{v}_i$ and the $\bar{v}_j$ is set to $1/\sqrt{\alpha}$ and a normalization coefficient for the $\bar{v}_k$ and the $\bar{v}_l$ is set to $1/\sqrt{\beta}$, it meets $\alpha=\beta$.

Preferably, the first type precoding matrix has a type resulting from multiplying $$W_{N_t \times 3}^n = \begin{bmatrix} 1 & 0 & 1 \\ e^{j\theta_1} & 0 & -e^{j\theta_1} \\ 0 & 1 & 1 \\ 0 & e^{j\theta_2} & -e^{j\theta_2} \end{bmatrix} \text{ or }$$

$$W_{N_t \times 3}^n = \begin{bmatrix} 1 & 0 & 1 \\ -e^{j\theta_1} & 0 & e^{j\theta_1} \\ 0 & e^{j\theta_2} & e^{j\theta_2} \\ 0 & -e^{j\theta_3} & e^{j\theta_3} \end{bmatrix}$$

by a normalization coefficient, the $N_t$ is 4, the $\theta_1$, $\theta_2$ meet a condition of $$\theta_2 \in \left\{ \frac{2\pi}{N} i, i = 0, \ldots, N-1 \right\},$$

and the N is set to 4 or 8.

Preferably, the 4-antenna codebook further includes a second type precoding matrix of a 4*3 type including one non-zero component in each row.

More preferably, the second type precoding matrix has a type resulting from multiplying $$W_{N_t \times 3}^n = \begin{bmatrix} 1 & 0 & 0 \\ 0 & 1 & 0 \\ 0 & 0 & 1 \\ 0 & 0 & e^{j\theta} \end{bmatrix}$$

by a normalization coefficient, the $N_t$ is 4, the $\theta$ meets a condition of $$\theta \in \left\{ \frac{2\pi}{N} i, i = 0, \ldots, N-1 \right\},$$

and the N is set to 4 or 8. In this case, the second type precoding matrix has a type multiplied by either a coefficient for inter-antenna power normalization or inter-layer power normalization.

In another aspect of the present invention, a method of receiving a signal, which is received by a base station from a user equipment configured to use 4 antennas, includes the steps of receiving a reception signal from the user equipment, obtaining transmission rank and precoding matrix identification information used by the user equipment for the reception signal transmission, and performing reverse processing of precoding on the reception signal by selecting one precoding matrix corresponding to the transmission rank and precoding matrix identification information from a 4-antenna codebook, wherein the 4 antennas are grouped into a first antenna group including two of the 4 antennas and a second antenna group including the rest of the 4 antennas and wherein the 4-antenna codebook includes a first type precoding matrix, in which two components corresponding to the first antenna group are zero and two components corresponding to the second antenna group construct a DFT matrix, and a second type precoding matrix, in which two components corresponding to the first antenna group and two components corresponding to the second antenna group construct DFT matrixes, respectively, for a rank 1.

In another aspect of the present invention, a method of receiving a signal, which is received by a base station from a user equipment using 4 antennas, includes the steps of receiving a reception signal from the user equipment, obtaining transmission rank and precoding matrix identification information used by the user equipment for the reception signal transmission, and performing reverse processing of precoding on the reception signal by selecting one precoding matrix corresponding to the transmission rank and precoding matrix identification information from a 4-antenna codebook including a first type precoding matrix of 4*3 matrix type including 2 non-zero components in each row for a rank 3 and 2 zero components in first and second columns.

In another aspect of the present invention, a user equipment includes a first antenna group including a first antenna and a second antenna, a second antenna group including a third antenna and a fourth antenna, a memory configured to store a 4-antenna codebook including a first type precoding matrix, in which two components corresponding to the first antenna group are zero and two components corresponding to the second antenna group construct a DFT matrix, and a second type precoding matrix, in which two components corresponding to the first antenna group and two components corresponding to the second antenna group construct DFT matrixes, respectively, for a rank 1, and a precoder outputting a signal precoded by selecting one precoding matrix corresponding to a transmission rank from the 4-antenna codebook stored in the memory and then performing precoding on layer signals of which number corresponds to the transmission rank, wherein the signal precoded by the precoder is transmitted to a base station via at least one selected from the group consisting of the first antenna group and the second antenna group.

In another aspect of the present invention, a user equipment includes a memory configured to store a 4-antenna codebook including a first type precoding matrix of 4*3 matrix type including 2 non-zero components in each row for a rank 3 and 2 zero components in first and second columns, a precoder outputting a precoded signal by selecting one precoding matrix corresponding to the transmission rank from the 4-antenna codebook, the precoder performing precoding on layer signals of which number corresponds to the transmission rank, and four antennas configured to transmit the signal precoded by the precoder to a base station.

In another aspect of the present invention, a base station includes an antenna configured to receive a reception signal transmitted from a user equipment configured to transmit a signal using four antennas grouped into a first antenna group including two of the 4 antennas and a second antenna group including the rest of the 4 antennas, a memory configured to store a 4-antenna codebook including a first type precoding matrix, in which two components corresponding to the first antenna group are zero and two components corresponding to the second antenna group construct a DFT matrix, and a second type precoding matrix, in which two components corresponding to the first antenna group and two components corresponding to the second antenna group construct DFT matrixes, respectively, for a rank 1, and a precoder performing reverse processing of precoding on the reception signal by selecting one precoding matrix corresponding to transmission rank and precoding matrix identification information used by the user equipment from the 4-antenna codebook.

In another aspect of the present invention, a base station includes an antenna configured to receive a reception signal transmitted from a user equipment configured to use four antennas, a memory configured to store a 4-antenna codebook including a first type precoding matrix of 4*3 matrix type including 2 non-zero components in each row for a rank 3 and 2 zero components in first and second columns, and a precoder performing reverse processing of precoding on the reception signal received via the antenna by selecting one precoding matrix corresponding to transmission rank and precoding matrix identification information used by the user equipment from the 4-antenna codebook stored in the memory.

Besides, it is apparent that the above-mentioned embodiments for the rank 1, rank 2 and rank 3 of the 4-antenna codebook are usable in a manner of being combined into a type including a prescribed number of precoding matrixes for each of the ranks in one codebook.

Accordingly, the present invention provides the following effects and/or advantages.

First of all, if a codebook according to one of embodiments of the present invention is used, it is able to efficiently perform a transmission control per antenna group.

Secondly, in uplink signal transmission, the present invention is able to maintain a sensitive PAPR/CM property well.

Effects attainable from the embodiments of the present invention are non-limited to the above-mentioned effects. Other unmentioned effects can be clearly derived and understood from the description of the following embodiments of the present invention by those having ordinary skill in the art to which the present invention pertains. Namely, effects unintended in the application stage of the present invention can be derived from the embodiments of the present invention by those having ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
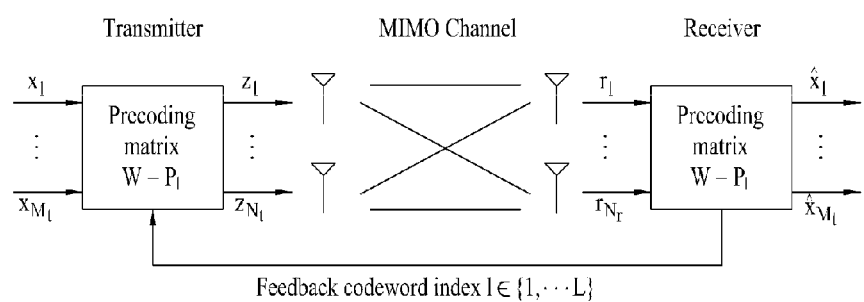
FIG. 1 is a diagram for explaining a basic concept of codebook based precoding.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, the following description is made with reference to predetermined terminologies, by which the present invention is non-limited. Even if an arbitrary terminology is used, it can have the same meaning of the predetermined terminology. Wherever possible, the same reference numbers will be used throughout the drawings to refer to the same or like parts.

In the following description, 'rank' indicates the number of paths for carrying signals independently and 'the number of layers' indicates the number of signal streams transmitted via each path. Generally, as a transmitting side transmits layers of which number corresponds to the rank number used for signal transmission, a rank has the same meaning of the layer number (i.e., the number of layers) unless there is a special note. In a precoding matrix, assume that a row corresponds to each antenna and that a column corresponds to a rank or each layer signal.

Table 1 shows 4-antenna codebook structure in LTE release 8.

TABLE 1

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 1, $W_n^{\{s\}}$ can be prescribed as $W_n = I - 2u_n u_n^H / u_n^H u_n$ for a set including a column indicated by $\{s\}$. In this case, I indicates 4*4 identity matrix. Referring to Table 1, 4-Tx codebook prescribed in LTE release 8 is constructed with total 64 precoding matrixes including 16 precoding matrixes for each rank. The codebook shown in Table 1 has the following properties.

Constant modulus property: each component of each precoding vector/matrix has uniform power.

Nested property: a precoding vector/matrix at a low rank is included in a column of a precoding vector/matrix of a high rank.

Limited number of components: component (precoding alphabet) of precoding matrix is limited to $$\left\{ \pm 1,\ \pm j,\ \pm \frac{(1+j)}{\sqrt{2}},\ \pm \frac{(-1+j)}{\sqrt{2}} \right\}.$$

In consideration of the above mentioned features, a codebook structure for uplink signal transmission in LTE-A system is explained as follows.

Figure 2:
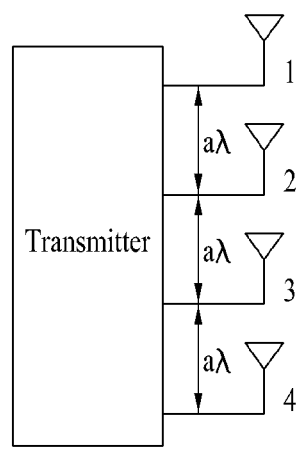
FIG. 2 is a diagram for explaining ULA antenna setup and X-pol antenna setup.
Figure 2:
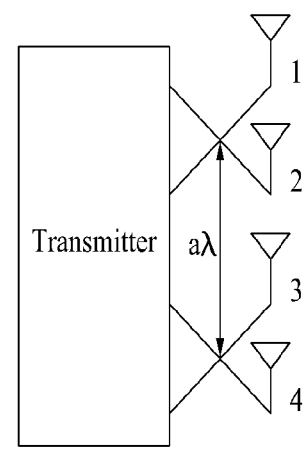

FIG. 2 is a diagram for explaining ULA antenna setup and X-pol antenna setup.

The codebook structure shown in Table 1 is designed in consideration of ULA (uniform linear array) antenna setup shown in a left part of FIG. 2. Generally, the ULA antenna type needs a big antenna space to maintain antenna correlation over a predetermined level. Accordingly, in order to use a number of antennas like 4Tx, 8Tx or the like, a cross-pol (X-pol) antenna setup shown in a right part of FIG. 2 is used. In case of the X-pol antenna setup, it is able to reduce an antenna space smaller than that of the ULA antenna setup. Therefore, the X-pol antenna setup is taken into consideration in designing 4-Tx system codebook for LTE-A.

A precoding matrix can be represented as $N_t \times R$ matrix. In this case, $N_t$ indicates the number of antennas and R indicates a rank. A codebook for the rank R can be represented as $W_{N_t \times R}^i$, $i = 0, \ldots, N_{rank}$. In this case, $N_{rank}$ indicates the number of precoding matrixes for the rank R.

According to one embodiment of the present invention, $N_t$ antennas can be divided into at least two groups. For instance, antenna port 1 and antenna port 3 can be grouped into one antenna group in the setup shown in the right part of FIG. 2, while antenna port 2 and antenna port 4 can be grouped into another antenna group in the setup shown in the right part of FIG. 2.

A recoding matrix can be designed to be suitable for each of the above-mentioned antennas groups. For instance, 2Tx codebook is usable for each of the above-mentioned antenna groups and is also usable by being combined for 4Tx codebook. In order to completely separate these two antenna groups from each other, one embodiment of the present invention proposes to use a zero vector/matrix. If 4Tx system includes two antenna groups each of which includes two antennas, Table 2 shows vectors/matrixes usable for each of the antenna groups.

TABLE 2

| Number of layers $\upsilon$ | Precoding vectors/matrices | Zero vector/matrix |
|---|---|---|
| 1 | $\underbrace{\begin{bmatrix} v_1^1 \\ v_1^2 \end{bmatrix}}_{v_1}, \underbrace{\begin{bmatrix} v_2^1 \\ v_2^2 \end{bmatrix}}_{v_2}, \underbrace{\begin{bmatrix} v_3^1 \\ v_3^2 \end{bmatrix}}_{v_3}, \underbrace{\begin{bmatrix} v_4^1 \\ v_4^2 \end{bmatrix}}_{v_4}$ | $\underbrace{\begin{bmatrix} 0 \\ 0 \end{bmatrix}}_{z}$ |
| 2 | $\underbrace{\begin{bmatrix} 1 & 0 \\ 0 & 1 \end{bmatrix}}_{w}$ | $\underbrace{\begin{bmatrix} 0 & 0 \\ 0 & 0 \end{bmatrix}}_{z}$ |

In Table 2, $v_i^j$, $i = 1, \ldots, 4$, $j = 1, 2$, indicates a complex number value having a unit power. If a component of each precoding matrix is limited to $\{\pm 1, \pm j\}$, precoding vector/matrix candidates for each antenna group can be represented as follows.

TABLE 3

| Number of layers $\upsilon$ | Precoding vectors/matrices | Zero vector/matrix |
|---|---|---|
| 1 | $\underbrace{\begin{bmatrix} 1 \\ 1 \end{bmatrix}}_{v_1}, \underbrace{\begin{bmatrix} 1 \\ -1 \end{bmatrix}}_{v_2}, \underbrace{\begin{bmatrix} 1 \\ j \end{bmatrix}}_{v_3}, \underbrace{\begin{bmatrix} 1 \\ -j \end{bmatrix}}_{v_4}$ | $\underbrace{\begin{bmatrix} 0 \\ 0 \end{bmatrix}}_{z}$ |
| 2 | $\underbrace{\begin{bmatrix} 1 & 0 \\ 0 & 1 \end{bmatrix}}_{w}$ | $\underbrace{\begin{bmatrix} 0 & 0 \\ 0 & 0 \end{bmatrix}}_{z}$ |

According to another embodiment of the present invention, it is able to design a codebook using the following precoding vector/matrix candidates.

TABLE 4

| Number of layers $v$ | Precoding vectors/matrices | Zero vector/matrix |
|---|---|---|
| 1 | $\underbrace{\begin{bmatrix}1\\1\end{bmatrix}}_{v_1}, \underbrace{\begin{bmatrix}1\\-1\end{bmatrix}}_{v_2}, \underbrace{\begin{bmatrix}1\\j\end{bmatrix}}_{v_3}, \underbrace{\begin{bmatrix}1\\-j\end{bmatrix}}_{v_4}$ | $\underbrace{\begin{bmatrix}0\\0\end{bmatrix}}_{\tau}, \underbrace{\begin{bmatrix}0\\1\end{bmatrix}}_{\gamma_1}, \underbrace{\begin{bmatrix}1\\0\end{bmatrix}}_{\gamma_2}$ |

In Table 3 and Table 4, matrixes except zero vector/matrix can be called DFT matrixes. In the following description, 4Tx uplink codebook is described in detail per rank.

Rank-1 Codebook

First of all, it is able to design a rank-1 precoding matrix of 4Tx system by combining two vectors/matrixes for 1 layer in Table 3 or Table 4 in one column.

Total combinations of precoding vectors/matrixes per antenna except zero vector/matrix in Table 3 or Table 4 can be represented as follows.

TABLE 5

| Number of layers $v$ | Layer-1 codebook ($W^n_{N_t \times 1}$) |
|---|---|
| 1 | $\begin{bmatrix}v_1\\v_1\end{bmatrix}, \begin{bmatrix}v_1\\v_2\end{bmatrix}, \begin{bmatrix}v_1\\v_3\end{bmatrix}, \begin{bmatrix}v_1\\v_4\end{bmatrix}, \begin{bmatrix}v_2\\v_1\end{bmatrix}, \begin{bmatrix}v_2\\v_2\end{bmatrix}, \begin{bmatrix}v_2\\v_3\end{bmatrix}, \begin{bmatrix}v_2\\v_4\end{bmatrix},$ $\begin{bmatrix}v_3\\v_1\end{bmatrix}, \begin{bmatrix}v_3\\v_2\end{bmatrix}, \begin{bmatrix}v_3\\v_3\end{bmatrix}, \begin{bmatrix}v_3\\v_4\end{bmatrix}, \begin{bmatrix}v_4\\v_1\end{bmatrix}, \begin{bmatrix}v_4\\v_2\end{bmatrix}, \begin{bmatrix}v_4\\v_3\end{bmatrix}, \begin{bmatrix}v_4\\v_4\end{bmatrix}$ |

Meanwhile, it is able to design a codebook in consideration of antenna permutation. In this case, it is able to permutate all precoding vectors/matrixes within the codebook using the same antenna permutation matrix $\Pi$. According to this embodiment, the precoding matrixes shown in Table 5 can be represented as follows using a permutation matrix.

$$\Pi \cdot W_{N_t \times 1}, n=0, \ldots, N_c-1 \quad \text{[Formula 1]}$$

In Formula 1, $N_c$ indicates the number of precoding vectors/matrixes per layer. The above-described permutation matrix can be represented as follows.

TABLE 6

| $\Pi$ | | | |
|---|---|---|---|
| $\Pi_1$ | $\Pi_2$ | $\Pi_3$ | $\Pi_4$ |
| $\begin{bmatrix}1&0&0&0\\0&0&1&0\\0&1&0&0\\0&0&0&1\end{bmatrix}$ | $\begin{bmatrix}1&0&0&0\\0&1&0&0\\0&0&0&1\\0&0&1&0\end{bmatrix}$ | $\begin{bmatrix}1&0&0&0\\0&0&1&0\\0&0&0&1\\0&1&0&0\end{bmatrix}$ | $\begin{bmatrix}1&0&0&0\\0&0&0&1\\0&1&0&0\\0&0&1&0\end{bmatrix}$ |
| $\Pi_5$ | $\Pi_6$ | $\Pi_7$ | $\Pi_8$ |
| $\begin{bmatrix}1&0&0&0\\0&0&0&1\\0&0&1&0\\0&1&0&0\end{bmatrix}$ | $\begin{bmatrix}0&1&0&0\\1&0&0&0\\0&0&1&0\\0&0&0&1\end{bmatrix}$ | $\begin{bmatrix}0&1&0&0\\1&0&0&0\\0&0&0&1\\0&0&1&0\end{bmatrix}$ | $\begin{bmatrix}0&1&0&0\\0&0&1&0\\0&0&0&1\\1&0&0&0\end{bmatrix}$ |
| $\Pi_9$ | $\Pi_{10}$ | $\Pi_{11}$ | $\Pi_{12}$ |
| $\begin{bmatrix}0&1&0&0\\0&0&1&0\\1&0&0&0\\0&0&0&1\end{bmatrix}$ | $\begin{bmatrix}0&1&0&0\\0&0&0&1\\1&0&0&0\\0&0&1&0\end{bmatrix}$ | $\begin{bmatrix}0&1&0&0\\0&0&0&1\\0&0&1&0\\1&0&0&0\end{bmatrix}$ | $\begin{bmatrix}0&0&1&0\\1&0&0&0\\0&1&0&0\\0&0&0&1\end{bmatrix}$ |

TABLE 6-continued

| $\Pi$ | | | |
|---|---|---|---|
| $\Pi_{13}$ | $\Pi_{14}$ | $\Pi_{15}$ | $\Pi_{16}$ |
| $\begin{bmatrix}0&0&1&0\\1&0&0&0\\0&0&0&1\\0&1&0&0\end{bmatrix}$ | $\begin{bmatrix}0&0&1&0\\0&1&0&0\\1&0&0&0\\0&0&0&1\end{bmatrix}$ | $\begin{bmatrix}0&0&1&0\\0&1&0&0\\0&0&0&1\\1&0&0&0\end{bmatrix}$ | $\begin{bmatrix}0&0&1&0\\0&0&0&1\\1&0&0&0\\0&1&0&0\end{bmatrix}$ |
| $\Pi_{17}$ | $\Pi_{18}$ | $\Pi_{19}$ | $\Pi_{20}$ |
| $\begin{bmatrix}0&0&1&0\\0&0&0&1\\0&1&0&0\\1&0&0&0\end{bmatrix}$ | $\begin{bmatrix}0&0&0&1\\1&0&0&0\\0&1&0&0\\0&0&1&0\end{bmatrix}$ | $\begin{bmatrix}0&0&0&1\\1&0&0&0\\0&0&1&0\\0&1&0&0\end{bmatrix}$ | $\begin{bmatrix}0&0&0&1\\0&1&0&0\\1&0&0&0\\0&0&1&0\end{bmatrix}$ |
| $\Pi_{21}$ | $\Pi_{22}$ | $\Pi_{23}$ | |
| $\begin{bmatrix}0&0&0&1\\0&1&0&0\\0&0&1&0\\1&0&0&0\end{bmatrix}$ | $\begin{bmatrix}0&0&0&1\\0&0&1&0\\1&0&0&0\\0&1&0&0\end{bmatrix}$ | $\begin{bmatrix}0&0&0&1\\0&0&1&0\\0&1&0&0\\1&0&0&0\end{bmatrix}$ | |

For clarity of the following description, assume that $\Pi_1$ is used as a permutation matrix. Yet, other permutation matrixes are available as well.

If the precoding vector/matrix per antenna shown in Table 4 is applied to Table 5, it is able to configure the following rank-1 (layer-1) codebook.

TABLE 7

| Number of layers $v$ | Layer-1 codebook ($W^n_{N_t \times 1}$) |
|---|---|
| 1 | $\begin{bmatrix}1\\1\\1\\1\end{bmatrix}, \begin{bmatrix}1\\1\\1\\-1\end{bmatrix}, \begin{bmatrix}1\\1\\1\\j\end{bmatrix}, \begin{bmatrix}1\\1\\1\\-j\end{bmatrix}, \begin{bmatrix}1\\-1\\-1\\1\end{bmatrix}, \begin{bmatrix}1\\-1\\-1\\-1\end{bmatrix}, \begin{bmatrix}1\\-1\\-1\\j\end{bmatrix}, \begin{bmatrix}1\\-1\\-1\\-j\end{bmatrix},$ $\begin{bmatrix}1\\j\\1\\1\end{bmatrix}, \begin{bmatrix}1\\j\\1\\-1\end{bmatrix}, \begin{bmatrix}1\\j\\1\\j\end{bmatrix}, \begin{bmatrix}1\\j\\1\\-j\end{bmatrix}, \begin{bmatrix}1\\-j\\1\\1\end{bmatrix}, \begin{bmatrix}1\\-j\\1\\-1\end{bmatrix}, \begin{bmatrix}1\\-j\\1\\j\end{bmatrix}, \begin{bmatrix}1\\-j\\1\\-j\end{bmatrix}$ |

Moreover, if a permutation using antenna permutation matrix $\Pi_1$ is additionally taken into consideration for Table 7, it is able to design the following rank-1 codebook.

TABLE 8

| Number of layers $v$ | Layer-1 codebook ($\Pi \cdot W^n_{N_t \times 1}$) |
|---|---|
| 1 | $\begin{bmatrix}1\\1\\1\\1\end{bmatrix}, \begin{bmatrix}1\\1\\1\\-1\end{bmatrix}, \begin{bmatrix}1\\1\\1\\j\end{bmatrix}, \begin{bmatrix}1\\1\\1\\-j\end{bmatrix}, \begin{bmatrix}1\\-1\\-1\\1\end{bmatrix}, \begin{bmatrix}1\\-1\\-1\\-1\end{bmatrix}, \begin{bmatrix}1\\-1\\-1\\j\end{bmatrix}, \begin{bmatrix}1\\-1\\-1\\-j\end{bmatrix},$ $\begin{bmatrix}1\\1\\j\\1\end{bmatrix}, \begin{bmatrix}1\\1\\j\\-1\end{bmatrix}, \begin{bmatrix}1\\1\\j\\j\end{bmatrix}, \begin{bmatrix}1\\1\\j\\-j\end{bmatrix}, \begin{bmatrix}1\\1\\-j\\1\end{bmatrix}, \begin{bmatrix}1\\1\\-j\\-1\end{bmatrix}, \begin{bmatrix}1\\1\\-j\\j\end{bmatrix}, \begin{bmatrix}1\\1\\-j\\-j\end{bmatrix}$ |

According to another embodiment of the present invention, only part of precoding matrixes in the rank-1 codebook can be configured in a type that uses a permutation matrix as follows.

TABLE 9

| Number of layers v | Layer-1 codebook ($W_{N_t \times 1}{}''$) |
|---|---|
| 1 | $\begin{bmatrix}\bar{v}_1\\\bar{v}_1\end{bmatrix}, \begin{bmatrix}\bar{v}_1\\\bar{v}_2\end{bmatrix}, \begin{bmatrix}\bar{v}_2\\\bar{v}_1\end{bmatrix}, \begin{bmatrix}\bar{v}_2\\\bar{v}_2\end{bmatrix},$ $\begin{bmatrix}\bar{v}_3\\\bar{v}_3\end{bmatrix}, \begin{bmatrix}\bar{v}_3\\\bar{v}_4\end{bmatrix}, \begin{bmatrix}\bar{v}_4\\\bar{v}_3\end{bmatrix}, \begin{bmatrix}\bar{v}_4\\\bar{v}_4\end{bmatrix},$ $\Pi\begin{bmatrix}\bar{v}_1\\\bar{v}_1\end{bmatrix}, \Pi\begin{bmatrix}\bar{v}_1\\\bar{v}_2\end{bmatrix}, \Pi\begin{bmatrix}\bar{v}_2\\\bar{v}_1\end{bmatrix}, \Pi\begin{bmatrix}\bar{v}_2\\\bar{v}_2\end{bmatrix},$ $\Pi\begin{bmatrix}\bar{v}_3\\\bar{v}_3\end{bmatrix}, \Pi\begin{bmatrix}\bar{v}_3\\\bar{v}_4\end{bmatrix}, \Pi\begin{bmatrix}\bar{v}_4\\\bar{v}_3\end{bmatrix}, \Pi\begin{bmatrix}\bar{v}_4\\\bar{v}_4\end{bmatrix}$ |

TABLE 10

| Number of layers v | Layer-1 codebook ($W_{N_t \times 1}{}''$) |
|---|---|
| 1 | $\begin{bmatrix}\bar{v}_1\\\bar{v}_1\end{bmatrix}, \begin{bmatrix}\bar{v}_1\\\bar{v}_2\end{bmatrix}, \begin{bmatrix}\bar{v}_1\\\bar{v}_3\end{bmatrix}, \begin{bmatrix}\bar{v}_1\\\bar{v}_4\end{bmatrix},$ $\begin{bmatrix}\bar{v}_2\\\bar{v}_1\end{bmatrix}, \begin{bmatrix}\bar{v}_2\\\bar{v}_2\end{bmatrix}, \begin{bmatrix}\bar{v}_2\\\bar{v}_3\end{bmatrix}, \begin{bmatrix}\bar{v}_2\\\bar{v}_4\end{bmatrix},$ $\begin{bmatrix}\bar{v}_3\\\bar{v}_3\end{bmatrix}, \begin{bmatrix}\bar{v}_3\\\bar{v}_4\end{bmatrix}, \begin{bmatrix}\bar{v}_4\\\bar{v}_3\end{bmatrix}, \begin{bmatrix}\bar{v}_4\\\bar{v}_4\end{bmatrix},$ $\Pi\begin{bmatrix}\bar{v}_3\\\bar{v}_3\end{bmatrix}, \Pi\begin{bmatrix}\bar{v}_3\\\bar{v}_4\end{bmatrix}, \Pi\begin{bmatrix}\bar{v}_4\\\bar{v}_3\end{bmatrix}, \Pi\begin{bmatrix}\bar{v}_4\\\bar{v}_4\end{bmatrix}$ |

Meanwhile, according to one preferred embodiment of the present invention, proposed is a method of designing a codebook to have a mutually orthogonal property between vectors/matrixes corresponding to each antenna group in a precoding matrix within a codebook. Table 11 shows an example for configuring a codebook by selecting precoding matrixes meeting the mutually orthogonal property between the corresponding antenna groups shown in Table 5.

TABLE 11

| Number of layers v | Layer-1 codebook ($W_{N_t \times 1}{}''$) |
|---|---|
| 1 | $\begin{bmatrix}\bar{v}_1\\\bar{v}_1\end{bmatrix}, \begin{bmatrix}\bar{v}_2\\\bar{v}_2\end{bmatrix}, \begin{bmatrix}\bar{v}_3\\\bar{v}_3\end{bmatrix}, \begin{bmatrix}\bar{v}_4\\\bar{v}_4\end{bmatrix},$ $\Pi\begin{bmatrix}\bar{v}_1\\\bar{v}_1\end{bmatrix}, \Pi\begin{bmatrix}\bar{v}_2\\\bar{v}_2\end{bmatrix}, \Pi\begin{bmatrix}\bar{v}_3\\\bar{v}_3\end{bmatrix}, \Pi\begin{bmatrix}\bar{v}_4\\\bar{v}_4\end{bmatrix},$ |

Meanwhile, according to one embodiment of the present invention, proposed is a method of configuring a codebook that includes an antenna group selection matrix. In particular, in case that 4 antennas are grouped into a first antenna group including 2 of the 4 antennas and a second antenna group including the rest, the codebook is designed in a manner that 2 components corresponding to one of the antenna groups are set to 0 and that 2 components corresponding to the other antenna group construct a DFT matrix. Through this, it is able to turn off antennas by an antenna group unit at a timing point of transmitting an uplink signal to a base station from a user equipment.

Table 12 shows an example of the above-described antenna group selection matrix.

TABLE 12

| Number of layers v | Layer-1 codebook ($W_{N_t \times 1}{}''$) |
|---|---|
| 1 | $\begin{bmatrix}\bar{v}_1\\z\end{bmatrix}, \begin{bmatrix}\bar{v}_2\\z\end{bmatrix}, \begin{bmatrix}\bar{v}_3\\z\end{bmatrix}, \begin{bmatrix}\bar{v}_4\\z\end{bmatrix},$ $\begin{bmatrix}z\\\bar{v}_1\end{bmatrix}, \begin{bmatrix}z\\\bar{v}_2\end{bmatrix}, \begin{bmatrix}z\\\bar{v}_3\end{bmatrix}, \begin{bmatrix}z\\\bar{v}_4\end{bmatrix},$ $\Pi\begin{bmatrix}\bar{v}_1\\z\end{bmatrix}, \Pi\begin{bmatrix}\bar{v}_2\\z\end{bmatrix}, \Pi\begin{bmatrix}\bar{v}_3\\z\end{bmatrix}, \Pi\begin{bmatrix}\bar{v}_4\\z\end{bmatrix},$ $\Pi\begin{bmatrix}z\\\bar{v}_1\end{bmatrix}, \Pi\begin{bmatrix}z\\\bar{v}_2\end{bmatrix}, \Pi\begin{bmatrix}z\\\bar{v}_3\end{bmatrix}, \Pi\begin{bmatrix}z\\\bar{v}_4\end{bmatrix}$ |

According to a preferred embodiment of the present invention, proposed is a method of configuring 4Tx rank-1 codebook in a manner that the corresponding codebook includes both of the antenna group selection matrix shown in Table 12 and the DFT matrix shown in Table 5. Table 13 and Table 14 are examples for the 4Tx rank-1 codebook according to this embodiment.

TABLE 13

| Number of layers v | Layer-1 codebook ($W_{N_t \times 1}{}''$) |
|---|---|
| 1 | $\begin{bmatrix}\bar{v}_1\\z\end{bmatrix}, \begin{bmatrix}\bar{v}_2\\z\end{bmatrix}, \begin{bmatrix}\bar{v}_3\\z\end{bmatrix}, \begin{bmatrix}\bar{v}_4\\z\end{bmatrix},$ $\begin{bmatrix}z\\\bar{v}_1\end{bmatrix}, \begin{bmatrix}z\\\bar{v}_2\end{bmatrix}, \begin{bmatrix}z\\\bar{v}_3\end{bmatrix}, \begin{bmatrix}z\\\bar{v}_4\end{bmatrix},$ $\begin{bmatrix}\bar{v}_1\\\bar{v}_1\end{bmatrix}, \begin{bmatrix}\bar{v}_1\\\bar{v}_2\end{bmatrix}, \begin{bmatrix}\bar{v}_2\\\bar{v}_1\end{bmatrix}, \begin{bmatrix}\bar{v}_2\\\bar{v}_2\end{bmatrix},$ $\begin{bmatrix}\bar{v}_3\\\bar{v}_3\end{bmatrix}, \begin{bmatrix}\bar{v}_3\\\bar{v}_4\end{bmatrix}, \begin{bmatrix}\bar{v}_4\\\bar{v}_3\end{bmatrix}, \begin{bmatrix}\bar{v}_4\\\bar{v}_4\end{bmatrix}$ |

TABLE 14

| Number of layers v | Layer-1 codebook ($W_{N_t \times 1}{}''$) |
|---|---|
| 1 | $\begin{bmatrix}\bar{v}_1\\z\end{bmatrix}, \begin{bmatrix}\bar{v}_2\\z\end{bmatrix}, \begin{bmatrix}\bar{v}_3\\z\end{bmatrix}, \begin{bmatrix}\bar{v}_4\\z\end{bmatrix},$ $\Pi\begin{bmatrix}\bar{v}_1\\z\end{bmatrix}, \Pi\begin{bmatrix}\bar{v}_2\\z\end{bmatrix}, \Pi\begin{bmatrix}\bar{v}_3\\z\end{bmatrix}, \Pi\begin{bmatrix}\bar{v}_4\\z\end{bmatrix},$ $\begin{bmatrix}\bar{v}_1\\\bar{v}_1\end{bmatrix}, \begin{bmatrix}\bar{v}_1\\\bar{v}_2\end{bmatrix}, \begin{bmatrix}\bar{v}_2\\\bar{v}_1\end{bmatrix}, \begin{bmatrix}\bar{v}_2\\\bar{v}_2\end{bmatrix},$ $\begin{bmatrix}\bar{v}_3\\\bar{v}_3\end{bmatrix}, \begin{bmatrix}\bar{v}_3\\\bar{v}_4\end{bmatrix}, \begin{bmatrix}\bar{v}_4\\\bar{v}_3\end{bmatrix}, \begin{bmatrix}\bar{v}_4\\\bar{v}_4\end{bmatrix}$ |

Rank-2 Codebook

According to one embodiment of the present invention, proposed is a method of setting a rank-2 codebook to further include a precoding matrix of a permutated type of the precoding matrix within the codebook shown in Table 15. In this case, if a used permutation matrix is represented as Π, a permutated precoding matrix can be represented as follows.

$$\Pi \cdot W_{N_t \times 2}{}^n, \ n=0, \ldots, N_c-1 \quad \text{[Formula 2]}$$

The above permutation matrix can be selected from Table 6.

In case that Table 4 is used as a precoding vector/matrix for each antenna group, Table 15 can be modified into Table 16.

TABLE 16

| Number of layers v | Layer-2 codebook ($W_{N_t \times 2}{}^n$) | | | |
|---|---|---|---|---|
| | $W_{N_t \times 2}{}^0$ $\begin{bmatrix} 1 & 0 \\ 1 & 0 \\ 0 & 1 \\ 0 & 1 \end{bmatrix}$ | $W_{N_t \times 2}{}^1$ $\begin{bmatrix} 1 & 0 \\ 1 & 0 \\ 0 & 1 \\ 0 & -1 \end{bmatrix}$ | $W_{N_t \times 2}{}^2$ $\begin{bmatrix} 1 & 0 \\ 1 & 0 \\ 0 & 1 \\ 0 & j \end{bmatrix}$ | $W_{N_t \times 2}{}^3$ $\begin{bmatrix} 1 & 0 \\ 1 & 0 \\ 0 & 1 \\ 0 & -j \end{bmatrix}$ |
| | $W_{N_t \times 2}{}^4$ $\begin{bmatrix} 1 & 0 \\ -1 & 0 \\ 0 & 1 \\ 0 & 1 \end{bmatrix}$ | $W_{N_t \times 2}{}^5$ $\begin{bmatrix} 1 & 0 \\ -1 & 0 \\ 0 & 1 \\ 0 & -1 \end{bmatrix}$ | $W_{N_t \times 2}{}^6$ $\begin{bmatrix} 1 & 0 \\ -1 & 0 \\ 0 & 1 \\ 0 & j \end{bmatrix}$ | $W_{N_t \times 2}{}^7$ $\begin{bmatrix} 1 & 0 \\ -1 & 0 \\ 0 & 1 \\ 0 & -j \end{bmatrix}$ |
| | $W_{N_t \times 2}{}^8$ $\begin{bmatrix} 1 & 0 \\ j & 0 \\ 0 & 1 \\ 0 & 1 \end{bmatrix}$ | $W_{N_t \times 2}{}^9$ $\begin{bmatrix} 1 & 0 \\ j & 0 \\ 0 & 1 \\ 0 & -1 \end{bmatrix}$ | $W_{N_t \times 2}{}^{10}$ $\begin{bmatrix} 1 & 0 \\ j & 0 \\ 0 & 1 \\ 0 & j \end{bmatrix}$ | $W_{N_t \times 2}{}^{11}$ $\begin{bmatrix} 1 & 0 \\ j & 0 \\ 0 & 1 \\ 0 & -j \end{bmatrix}$ |
| | $W_{N_t \times 2}{}^{12}$ $\begin{bmatrix} 1 & 0 \\ -j & 0 \\ 0 & 1 \\ 0 & 1 \end{bmatrix}$ | $W_{N_t \times 2}{}^{13}$ $\begin{bmatrix} 1 & 0 \\ -j & 0 \\ 0 & 1 \\ 0 & -1 \end{bmatrix}$ | $W_{N_t \times 2}{}^{14}$ $\begin{bmatrix} 1 & 0 \\ -j & 0 \\ 0 & 1 \\ 0 & j \end{bmatrix}$ | $W_{N_t \times 2}{}^{15}$ $\begin{bmatrix} 1 & 0 \\ -j & 0 \\ 0 & 1 \\ 0 & -j \end{bmatrix}$ |

If a permutation matrix is applied to Table 16, a rank-2 codebook can be represented as follows.

TABLE 17

| Number of layers v | Layer-2 codebook ($\Pi \cdot W_{N_t \times 2}{}^n$) | | | |
|---|---|---|---|---|
| 2 | $\Pi \cdot W_{N_t \times 2}{}^0$ $\begin{bmatrix} 1 & 0 \\ 0 & 1 \\ 1 & 0 \\ 0 & 1 \end{bmatrix}$ | $\Pi \cdot W_{N_t \times 2}{}^1$ $\begin{bmatrix} 1 & 0 \\ 0 & 1 \\ 1 & 0 \\ 0 & -1 \end{bmatrix}$ | $\Pi \cdot W_{N_t \times 2}{}^2$ $\begin{bmatrix} 1 & 0 \\ 0 & 1 \\ 1 & 0 \\ 0 & j \end{bmatrix}$ | $\Pi \cdot W_{N_t \times 2}{}^3$ $\begin{bmatrix} 1 & 0 \\ 0 & 1 \\ 1 & 0 \\ 0 & -j \end{bmatrix}$ |
| | $\Pi \cdot W_{N_t \times 2}{}^4$ $\begin{bmatrix} 1 & 0 \\ 0 & 1 \\ -1 & 0 \\ 0 & 1 \end{bmatrix}$ | $\Pi \cdot W_{N_t \times 2}{}^5$ $\begin{bmatrix} 1 & 0 \\ 0 & 1 \\ -1 & 0 \\ 0 & -1 \end{bmatrix}$ | $\Pi \cdot W_{N_t \times 2}{}^6$ $\begin{bmatrix} 1 & 0 \\ 0 & 1 \\ -1 & 0 \\ 0 & j \end{bmatrix}$ | $\Pi \cdot W_{N_t \times 2}{}^7$ $\begin{bmatrix} 1 & 0 \\ 0 & 1 \\ -1 & 0 \\ 0 & -j \end{bmatrix}$ |
| | $\Pi \cdot W_{N_t \times 2}{}^8$ $\begin{bmatrix} 1 & 0 \\ 0 & 1 \\ j & 0 \\ 0 & 1 \end{bmatrix}$ | $\Pi \cdot W_{N_t \times 2}{}^9$ $\begin{bmatrix} 1 & 0 \\ 0 & 1 \\ j & 0 \\ 0 & -1 \end{bmatrix}$ | $\Pi \cdot W_{N_t \times 2}{}^{10}$ $\begin{bmatrix} 1 & 0 \\ 0 & 1 \\ j & 0 \\ 0 & j \end{bmatrix}$ | $\Pi \cdot W_{N_t \times 2}{}^{11}$ $\begin{bmatrix} 1 & 0 \\ 0 & 1 \\ j & 0 \\ 0 & -j \end{bmatrix}$ |

TABLE 17-continued

| Number of layers v | Layer-2 codebook ($\Pi \cdot W_{N_t \times 2}{}^n$) | | | |
|---|---|---|---|---|
| | $\Pi \cdot W_{N_t \times 2}{}^{12}$ $\begin{bmatrix} 1 & 0 \\ 0 & 1 \\ -j & 0 \\ 0 & 1 \end{bmatrix}$ | $\Pi \cdot W_{N_t \times 2}{}^{13}$ $\begin{bmatrix} 1 & 0 \\ 0 & 1 \\ -j & 0 \\ 0 & -1 \end{bmatrix}$ | $\Pi \cdot W_{N_t \times 2}{}^{14}$ $\begin{bmatrix} 1 & 0 \\ 0 & 1 \\ -j & 0 \\ 0 & j \end{bmatrix}$ | $\Pi \cdot W_{N_t \times 2}{}^{15}$ $\begin{bmatrix} 1 & 0 \\ 0 & 1 \\ -j & 0 \\ 0 & -j \end{bmatrix}$ |

Meanwhile, according to one embodiment of the present invention, proposed is a method of designing a codebook to apply a physical antenna permutation and virtual swapping in addition. Formula 3 shows a precoding matrix type to which virtual antenna swapping is applied.

$$W_{N_t \times 2}{}^n \cdot \Xi \quad \text{[Formula 3]}$$

In Formula 3, Ξ indicates a virtual antenna swapping matrix. And, this virtual antenna swapping matrix can be represented as follows.

$$\Xi = \begin{bmatrix} 0 & 1 \\ 1 & 0 \end{bmatrix} \quad \text{[Formula 4]}$$

If the above-described virtual antenna swapping matrix is applied to Table 16/Table 17, Table 18/Table 19 can be generated.

TABLE 18

| Number of layers v | Layer-2 codebook ($W_{N_t \times 2} \cdot \Theta$) | | | |
|---|---|---|---|---|
| 2 | $W_{N_t \times 2}{}^0 \cdot \Theta$ $\begin{bmatrix} 0 & 1 \\ 0 & 1 \\ 1 & 0 \\ 1 & 0 \end{bmatrix}$ | $W_{N_t \times 2}{}^1 \cdot \Theta$ $\begin{bmatrix} 0 & 1 \\ 0 & 1 \\ 1 & 0 \\ -1 & 0 \end{bmatrix}$ | $W_{N_t \times 2}{}^2 \cdot \Theta$ $\begin{bmatrix} 0 & 1 \\ 0 & 1 \\ 1 & 0 \\ j & 0 \end{bmatrix}$ | $W_{N_t \times 2}{}^3 \cdot \Theta$ $\begin{bmatrix} 0 & 1 \\ 0 & 1 \\ 1 & 0 \\ -j & 0 \end{bmatrix}$ |
| | $W_{N_t \times 2}{}^4 \cdot \Theta$ $\begin{bmatrix} 0 & 1 \\ 0 & -1 \\ 1 & 0 \\ 1 & 0 \end{bmatrix}$ | $W_{N_t \times 2}{}^5 \cdot \Theta$ $\begin{bmatrix} 0 & 1 \\ 0 & -1 \\ 1 & 0 \\ -1 & 0 \end{bmatrix}$ | $W_{N_t \times 2}{}^6 \cdot \Theta$ $\begin{bmatrix} 0 & 1 \\ 0 & -1 \\ 1 & 0 \\ j & 0 \end{bmatrix}$ | $W_{N_t \times 2}{}^7 \cdot \Theta$ $\begin{bmatrix} 0 & 1 \\ 0 & -1 \\ 1 & 0 \\ -j & 0 \end{bmatrix}$ |
| | $W_{N_t \times 2}{}^8 \cdot \Theta$ $\begin{bmatrix} 0 & 1 \\ 0 & j \\ 1 & 0 \\ 1 & 0 \end{bmatrix}$ | $W_{N_t \times 2}{}^9 \cdot \Theta$ $\begin{bmatrix} 0 & 1 \\ 0 & j \\ 1 & 0 \\ -1 & 0 \end{bmatrix}$ | $W_{N_t \times 2}{}^{10} \cdot \Theta$ $\begin{bmatrix} 0 & 1 \\ 0 & j \\ 1 & 0 \\ j & 0 \end{bmatrix}$ | $W_{N_t \times 2}{}^{11} \cdot \Theta$ $\begin{bmatrix} 0 & 1 \\ 0 & j \\ 1 & 0 \\ -j & 0 \end{bmatrix}$ |
| | $W_{N_t \times 2}{}^{12} \cdot \Theta$ $\begin{bmatrix} 0 & 1 \\ 0 & -j \\ 1 & 0 \\ 1 & 0 \end{bmatrix}$ | $W_{N_t \times 2}{}^{13} \cdot \Theta$ $\begin{bmatrix} 0 & 1 \\ 0 & -j \\ 1 & 0 \\ -1 & 0 \end{bmatrix}$ | $W_{N_t \times 2}{}^{14} \cdot \Theta$ $\begin{bmatrix} 0 & 1 \\ 0 & -j \\ 1 & 0 \\ j & 0 \end{bmatrix}$ | $W_{N_t \times 2}{}^{15} \cdot \Theta$ $\begin{bmatrix} 0 & 1 \\ 0 & -j \\ 1 & 0 \\ -j & 0 \end{bmatrix}$ |

TABLE 19

| Number of layers $\nu$ | Layer-2 codebook ($\Pi \cdot W_{N_p\times 2}{}^n \cdot \Theta$) |
|---|---|
| 2 | $\Pi_1 \cdot W_{N_p\times 2}{}^0 \cdot \Theta$, $\Pi_1 \cdot W_{N\times 2}{}^1 \cdot \Theta$, $\Pi_1 \cdot W_{N_p\times 2}{}^2 \cdot \Theta$, $\Pi_1 \cdot W_{N_p\times 2}{}^3 \cdot \Theta$ |
|   | $\begin{bmatrix} 0 & 1 \\ 1 & 0 \\ 0 & 1 \\ 1 & 0 \end{bmatrix}$ $\begin{bmatrix} 0 & 1 \\ 1 & 0 \\ 0 & 1 \\ -1 & 0 \end{bmatrix}$ $\begin{bmatrix} 0 & 1 \\ 1 & 0 \\ 0 & 1 \\ j & 0 \end{bmatrix}$ $\begin{bmatrix} 0 & 1 \\ 1 & 0 \\ 0 & 1 \\ -j & 0 \end{bmatrix}$ |
|   | $\Pi_1 \cdot W_{N_p\times 2}{}^4 \cdot \Theta$, $\Pi_1 \cdot W_{N\times 2}{}^5 \cdot \Theta$, $\Pi_1 \cdot W_{N_p\times 2}{}^6 \cdot \Theta$, $\Pi_1 \cdot W_{N_p\times 2}{}^7 \cdot \Theta$ |
|   | $\begin{bmatrix} 0 & 1 \\ -1 & 0 \\ 0 & 1 \\ 1 & 0 \end{bmatrix}$ $\begin{bmatrix} 0 & 1 \\ -1 & 0 \\ 0 & 1 \\ -1 & 0 \end{bmatrix}$ $\begin{bmatrix} 0 & 1 \\ -1 & 0 \\ 0 & 1 \\ j & 0 \end{bmatrix}$ $\begin{bmatrix} 0 & 1 \\ -1 & 0 \\ 0 & 1 \\ -j & 0 \end{bmatrix}$ |
|   | $\Pi_1 \cdot W_{N_p\times 2}{}^8 \cdot \Theta$, $\Pi_1 \cdot W_{N\times 2}{}^9 \cdot \Theta$, $\Pi_1 \cdot W_{N_p\times 2}{}^{10} \cdot \Theta$, $\Pi_1 \cdot W_{N_p\times 2}{}^{11} \cdot \Theta$ |
|   | $\begin{bmatrix} 0 & 1 \\ j & 0 \\ 0 & 1 \\ 1 & 0 \end{bmatrix}$ $\begin{bmatrix} 0 & 1 \\ j & 0 \\ 0 & 1 \\ -1 & 0 \end{bmatrix}$ $\begin{bmatrix} 0 & 1 \\ j & 0 \\ 0 & 1 \\ j & 0 \end{bmatrix}$ $\begin{bmatrix} 0 & 1 \\ j & 0 \\ 0 & 1 \\ -j & 0 \end{bmatrix}$ |
|   | $\Pi_1 \cdot W_{N_p\times 2}{}^{12} \cdot \Theta$, $\Pi_1 \cdot W_{N\times 2}{}^{13} \cdot \Theta$, $\Pi_1 \cdot W_{N_p\times 2}{}^{14} \cdot \Theta$, $\Pi_1 \cdot W_{N_p\times 2}{}^{15} \cdot \Theta$ |
|   | $\begin{bmatrix} 0 & 1 \\ -j & 0 \\ 0 & 1 \\ 1 & 0 \end{bmatrix}$ $\begin{bmatrix} 0 & 1 \\ -j & 0 \\ 0 & 1 \\ -1 & 0 \end{bmatrix}$ $\begin{bmatrix} 0 & 1 \\ -j & 0 \\ 0 & 1 \\ j & 0 \end{bmatrix}$ $\begin{bmatrix} 0 & 1 \\ -j & 0 \\ 0 & 1 \\ -j & 0 \end{bmatrix}$ |

Meanwhile, according to one embodiment of the present invention, proposed is a rank-2 codebook of a type to which a physical antenna permutation is partially applied. In particular, parts of Table 16 and Table 17 can be included in a combined codebook type. Table 20/Table 21 shows a case that one permutation matrix is used per codebook, while table 22/Table 23 shows a case that two permutation matrixes are used per codebook.

TABLE 20

| Number of layers $\nu$ | Layer-2 codebook |
|---|---|
| 2 | $W_{N_p\times 2}{}^2$, $W_{N_p\times 2}{}^3$, $W_{N_p\times 2}{}^6$, $W_{N_p\times 2}{}^7$, $W_{N_p\times 2}{}^8$, $W_{N_p\times 2}{}^9$, $W_{N_p\times 2}{}^{12}$, $W_{N_p\times 2}{}^{13}$, $\Pi_1 \cdot W_{N_p\times 2}{}^0$, $\Pi_1 \cdot W_{N_p\times 2}{}^1$, $\Pi_1 \cdot W_{N_p\times 2}{}^4$, $\Pi_1 \cdot W_{N_p\times 2}{}^5$, $\Pi_1 \cdot W_{N_p\times 2}{}^6$, $\Pi_1 \cdot W_{N_p\times 2}{}^7$, $\Pi_1 \cdot W_{N_p\times 2}{}^{10}$, $\Pi_1 \cdot W_{N_p\times 2}{}^{11}$, |

Table 20 is characterized in that a subset of a total combination codebook is combined with a subset of a permutated codebook. All permutated elements do not originate from the subset of the total combination codebook. And, Table 20 shows a case that one permutation matrix is used only.

TABLE 21

| Number of layers $\nu$ | Layer-2 codebook |
|---|---|
| 2 | $W_{N_p\times 2}{}^2$, $W_{N_p\times 2}{}^3$, $W_{N_p\times 2}{}^6$, $W_{N_p\times 2}{}^7$, $W_{N_p\times 2}{}^8$, $W_{N_p\times 2}{}^9$, $W_{N_p\times 2}{}^{12}$, $W_{N_p\times 2}{}^{13}$, $\Pi_1 \cdot W_{N_p\times 2}{}^2$, $\Pi_1 \cdot W_{N_p\times 2}{}^3$, |

TABLE 21-continued

| Number of layers $\nu$ | Layer-2 codebook |
|---|---|
|   | $\Pi_1 \cdot W_{N_p\times 2}{}^6$, $\Pi_1 \cdot W_{N_p\times 2}{}^7$, $\Pi_1 \cdot W_{N_p\times 2}{}^8$, $\Pi_1 \cdot W_{N_p\times 2}{}^9$, $\Pi_1 \cdot W_{N_p\times 2}{}^{12}$, $\Pi_1 \cdot W_{N_p\times 2}{}^{13}$, |

Table 21 is characterized in that a subset of a total combination codebook is combined with a subset of a permutated codebook. All permutated elements originate from the subset of the total combination codebook. And, Table 21 shows a case that one permutation matrix is used only.

TABLE 22

| Number of layers $\nu$ | Layer-2 codebook |
|---|---|
| 2 | $W_{N_p\times 2}{}^2$, $W_{N_p\times 2}{}^3$, $W_{N_p\times 2}{}^6$, $W_{N_p\times 2}{}^7$, $W_{N_p\times 2}{}^8$, $W_{N_p\times 2}{}^9$, $W_{N_p\times 2}{}^{12}$, $W_{N_p\times 2}{}^{13}$, $\Pi_1 \cdot W_{N_p\times 2}{}^0$, $\Pi_1 \cdot W_{N_p\times 2}{}^1$, $\Pi_1 \cdot W_{N_p\times 2}{}^4$, $\Pi_1 \cdot W_{N_p\times 2}{}^5$, $\Pi_3 \cdot W_{N_p\times 2}{}^8$, $\Pi_3 \cdot W_{N_p\times 2}{}^9$, $\Pi_3 \cdot W_{N_p\times 2}{}^{12}$, $\Pi_3 \cdot W_{N_p\times 2}{}^{13}$, |

Table 22 is characterized in that a subset of a total combination codebook is combined with a subset of a permutated codebook. All permutated elements do not originate from the subset of the total combination codebook. And, Table 22 shows a case that a plurality of permutation matrixes is used.

TABLE 23

| Number of layers $\nu$ | Layer-2 codebook |
|---|---|
| 2 | $W_{N_p\times 2}{}^2$, $W_{N_p\times 2}{}^3$, $W_{N_p\times 2}{}^6$, $W_{N_p\times 2}{}^7$, $W_{N_p\times 2}{}^8$, $W_{N_p\times 2}{}^9$, $W_{N_p\times 2}{}^{12}$, $W_{N_p\times 2}{}^{13}$, $\Pi_1 \cdot W_{N_p\times 2}{}^2$, $\Pi_1 \cdot W_{N_p\times 2}{}^3$, $\Pi_1 \cdot W_{N_p\times 2}{}^6$, $\Pi_1 \cdot W_{N_p\times 2}{}^7$, $\Pi_3 \cdot W_{N_p\times 2}{}^8$, $\Pi_3 \cdot W_{N_p\times 2}{}^9$, $\Pi_3 \cdot W_{N_p\times 2}{}^{12}$, $\Pi_3 \cdot W_{N_p\times 2}{}^{13}$, |

Table 23 is characterized in that a subset of a total combination codebook is combined with a subset of a permutated codebook. All permutated elements originate from the subset of the total combination codebook. And, Table 22 shows a case that a plurality of permutation matrixes is used.

Meanwhile, according to another embodiment of the present invention, proposed is a codebook of a type in which permutation and swapping are combined with each other. Examples of a rank-2 codebook according to the present embodiment are shown as follows.

TABLE 24

| Number of layers $\nu$ | Layer-2 codebook |
|---|---|
| 2 | $W_{N_p\times 2}{}^2$, $W_{N_p\times 2}{}^3$, $W_{N_p\times 2}{}^6$, $W_{N_p\times 2}{}^7$, $W_{N_p\times 2}{}^8$, $W_{N_p\times 2}{}^9$, $W_{N_p\times 2}{}^{12}$, $W_{N_p\times 2}{}^{13}$, $\Pi_1 \cdot W_{N_p\times 2}{}^0 \cdot \Xi$, $\Pi_1 \cdot W_{N_p\times 2}{}^1 \cdot \Xi$, $\Pi_1 \cdot W_{N_p\times 2}{}^4 \cdot \Xi$, $\Pi_1 \cdot W_{N_p\times 2}{}^5 \cdot \Xi$, $\Pi_1 \cdot W_{N_p\times 2}{}^6 \cdot \Xi$, $\Pi_1 \cdot W_{N_p\times 2}{}^7 \cdot \Xi$, $\Pi_1 \cdot W_{N_p\times 2}{}^{10} \cdot \Xi$, $\Pi_1 \cdot W_{N_p\times 2}{}^{11} \cdot \Xi$, |

TABLE 25

| Number of layers ν | Layer-2 codebook |
|---|---|
| 2 | $W_{N_t\times 2}^2, W_{N_t\times 2}^3, W_{N_t\times 2}^6, W_{N_t\times 2}^7,$ $W_{N_t\times 2}^8, W_{N_t\times 2}^9, W_{N_t\times 2}^{12}, W_{N_t\times 2}^{13},$ $\Pi_1 \cdot W_{N_t\times 2}^2 \cdot \Xi, \Pi_1 \cdot W_{N_t\times 2}^3 \cdot \Xi,$ $\Pi_1 \cdot W_{N_t\times 2}^2 \cdot \Xi, \Pi_1 \cdot W_{N_t\times 2}^7 \cdot \Xi,$ $\Pi_1 \cdot W_{N_t\times 2}^6 \cdot \Xi, \Pi_1 \cdot W_{N_t\times 2}^9 \cdot \Xi,$ $\Pi_1 \cdot W_{N_t\times 2}^{12} \cdot \Xi, \Pi_1 \cdot W_{N_t\times 2}^{13} \cdot \Xi,$ |

Besides, various combinations are possible as follows.

TABLE 26

| Number of layers ν | Layer-2 codebook |
|---|---|
| 2 | $W_{N_t\times 2}^2, W_{N_t\times 2}^3, W_{N_t\times 2}^6, W_{N_t\times 2}^7,$ $W_{N_t\times 2}^8, W_{N_t\times 2}^9, W_{N_t\times 2}^{12}, W_{N_t\times 2}^{13},$ $\Pi \cdot W_{N_t\times 2}^0, \Pi \cdot W_{N_t\times 2}^1, \Pi \cdot W_{N_t\times 2}^4,$ $\Pi \cdot W_{N_t\times 2}^5,$ $W_{N_t\times 2}^6 \cdot \Xi, W_{N_t\times 2}^7 \cdot \Xi, W_{N_t\times 2}^{10} \cdot \Xi,$ $W_{N_t\times 2}^{11} \cdot \Xi,$ |

TABLE 27

| Number of layers ν | Layer-2 codebook |
|---|---|
| 2 | $W_{N_t\times 2}^2, W_{N_t\times 2}^3, W_{N_t\times 2}^6,$ $W_{N_t\times 2}^7,$ $W_{N_t\times 2}^8, W_{N_t\times 2}^9, W_{N_t\times 2}^{12},$ $W_{N_t\times 2}^{13},$ $\Pi \cdot W_{N_t\times 2}^0, \Pi \cdot W_{N_t\times 2}^1,$ $\Pi \cdot W_{N_t\times 2}^4, \Pi \cdot W_{N_t\times 2}^5,$ $W_{N_t\times 2}^6 \cdot \Xi, W_{N_t\times 2}^7 \cdot \Xi,$ $W_{N_t\times 2}^{10} \cdot \Xi, W_{N_t\times 2}^{11} \cdot \Xi,$ |

TABLE 28

| Number of layers ν | Layer-2 codebook |
|---|---|
| 2 | $W_{N_t\times 2}^2, W_{N_t\times 2}^3, W_{N_t\times 2}^6, W_{N_t\times 2}^7,$ $W_{N_t\times 2}^8, W_{N_t\times 2}^9, W_{N_t\times 2}^{12}, W_{N_t\times 2}^{13},$ $\Pi \cdot W_{N_t\times 2}^0, \Pi \cdot W_{N_t\times 2}^1, \Pi \cdot W_{N_t\times 2}^4,$ $\Pi \cdot W_{N_t\times 2}^5 \cdot \Xi,$ $\Pi \cdot W_{N_t\times 2}^6 \cdot \Xi, \Pi \cdot W_{N_t\times 2}^7 \cdot \Xi, W_{N_t\times 2}^{10} \cdot \Xi,$ $W_{N_t\times 2}^{11} \cdot \Xi,$ |

TABLE 29

| Number of layers ν | Layer-2 codebook |
|---|---|
| 2 | $W_{N_t\times 2}^2, W_{N_t\times 2}^3, W_{N_t\times 2}^6, W_{N_t\times 2}^7,$ $W_{N_t\times 2}^8, W_{N_t\times 2}^9, W_{N_t\times 2}^{12}, W_{N_t\times 2}^{13},$ $\Pi \cdot W_{N_t\times 2}^2, \Pi \cdot W_{N_t\times 2}^3, \Pi \cdot W_{N_t\times 2}^6,$ $\Pi_1 \cdot W_{N_t\times 2}^7 \cdot \Xi,$ $\Pi_1 \cdot W_{N_t\times 2}^8 \cdot \Xi, \Pi_1 \cdot W_{N_t\times 2}^9 \cdot \Xi, W_{N_t\times 2}^{12} \cdot \Xi,$ $W_{N_t\times 2}^{13} \cdot \Xi,$ |

According to another embodiment of the present invention, an antenna group selection matrix is configured as Table 30 or can be configured by being combined with other precoding matrixes as Tables 31 to 33.

TABLE 30

| Number of layers ν | Layer-2 codebook ($W_{N_t\times 2}^n$) |
|---|---|
| 2 | $\begin{bmatrix} \bar{v}_1 & \bar{v}_2 \\ \bar{z} & \bar{z} \end{bmatrix}, \begin{bmatrix} \bar{v}_3 & \bar{v}_4 \\ \bar{z} & \bar{z} \end{bmatrix}, \begin{bmatrix} \bar{z} & \bar{z} \\ \bar{v}_1 & \bar{v}_2 \end{bmatrix}, \begin{bmatrix} \bar{z} & \bar{z} \\ \bar{v}_3 & \bar{v}_4 \end{bmatrix}$ $\Pi \cdot \begin{bmatrix} \bar{v}_1 & \bar{v}_2 \\ \bar{z} & \bar{z} \end{bmatrix}, \Pi \cdot \begin{bmatrix} \bar{v}_3 & \bar{v}_4 \\ \bar{z} & \bar{z} \end{bmatrix}, \Pi \cdot \begin{bmatrix} \bar{z} & \bar{z} \\ \bar{v}_1 & \bar{v}_2 \end{bmatrix}, \Pi \cdot \begin{bmatrix} \bar{z} & \bar{z} \\ \bar{v}_3 & \bar{v}_4 \end{bmatrix}$ |

TABLE 31

| Number of layers ν | Layer-2 codebook ($W_{N_t\times 2}^n$) |
|---|---|
| 2 | $\begin{bmatrix} \bar{v}_1 & \bar{v}_2 \\ \bar{z} & \bar{z} \end{bmatrix}, \begin{bmatrix} \bar{v}_3 & \bar{v}_4 \\ \bar{z} & \bar{z} \end{bmatrix}, \begin{bmatrix} \bar{z} & \bar{z} \\ \bar{v}_1 & \bar{v}_2 \end{bmatrix}, \begin{bmatrix} \bar{z} & \bar{z} \\ \bar{v}_3 & \bar{v}_4 \end{bmatrix}$ $W_{N_t\times 2}^2, W_{N_t\times 2}^3, W_{N_t\times 2}^6, W_{N_t\times 2}^7,$ $W_{N_t\times 2}^8, W_{N_t\times 2}^9, W_{N_t\times 2}^{12}, W_{N_t\times 2}^{13},$ $\Pi_1 \cdot W_{N_t\times 2}^2, \Pi_1 \cdot W_{N_t\times 2}^3, \Pi_1 \cdot W_{N_t\times 2}^6,$ $\Pi_1 \cdot W_{N_t\times 2}^7,$ $\Pi_1 \cdot W_{N_t\times 2}^8, \Pi_1 \cdot W_{N_t\times 2}^9, \Pi_1 \cdot W_{N_t\times 2}^{12},$ $\Pi_1 \cdot W_{N_t\times 2}^{13},$ |

TABLE 32

| Number of layers ν | Layer-2 codebook ($W_{N_t\times 2}^n$) |
|---|---|
| 2 | $\begin{bmatrix} \bar{v}_1 & \bar{v}_2 \\ \bar{z} & \bar{z} \end{bmatrix}, \begin{bmatrix} \bar{v}_3 & \bar{v}_4 \\ \bar{z} & \bar{z} \end{bmatrix}, \begin{bmatrix} \bar{z} & \bar{z} \\ \bar{v}_1 & \bar{v}_2 \end{bmatrix}, \begin{bmatrix} \bar{z} & \bar{z} \\ \bar{v}_3 & \bar{v}_4 \end{bmatrix}$ $W_{N_t\times 2}^2, W_{N_t\times 2}^3, W_{N_t\times 2}^6, W_{N_t\times 2}^7,$ $\Pi \cdot W_{N_t\times 2}^0, \Pi \cdot W_{N_t\times 2}^1, \Pi \cdot W_{N_t\times 2}^4,$ $\Pi \cdot W_{N_t\times 2}^5,$ $\Pi \cdot W_{N_t\times 2}^6, \Pi \cdot W_{N_t\times 2}^7, \Pi \cdot W_{N_t\times 2}^{10},$ $\Pi \cdot W_{N_t\times 2}^{11},$ |

TABLE 33

| Number of layers ν | Layer-2 codebook ($W_{N_t\times 2}^n$) |
|---|---|
| 2 | $\begin{bmatrix} \bar{v}_1 & \bar{v}_2 \\ \bar{z} & \bar{z} \end{bmatrix}, \begin{bmatrix} \bar{v}_3 & \bar{v}_4 \\ \bar{z} & \bar{z} \end{bmatrix}, \begin{bmatrix} \bar{z} & \bar{z} \\ \bar{v}_1 & \bar{v}_2 \end{bmatrix}, \begin{bmatrix} \bar{z} & \bar{z} \\ \bar{v}_3 & \bar{v}_4 \end{bmatrix}$ $\Pi \cdot \begin{bmatrix} \bar{v}_1 & \bar{v}_2 \\ \bar{z} & \bar{z} \end{bmatrix}, \Pi \cdot \begin{bmatrix} \bar{v}_3 & \bar{v}_4 \\ \bar{z} & \bar{z} \end{bmatrix}, \Pi \cdot \begin{bmatrix} \bar{z} & \bar{z} \\ \bar{v}_1 & \bar{v}_2 \end{bmatrix}, \Pi \cdot \begin{bmatrix} \bar{z} & \bar{z} \\ \bar{v}_3 & \bar{v}_4 \end{bmatrix}$ $W_{N_t\times 2}^2, W_{N_t\times 2}^3, W_{N_t\times 2}^6, W_{N_t\times 2}^7,$ $\Pi \cdot W_{N_t\times}^0, \Pi \cdot W_{N_t\times}^1, \Pi \cdot W_{N_t\times}^4,$ $\Pi \cdot W_{N_t\times}^5,$ $\Pi \cdot W_{N_t\times}^6, \Pi \cdot W_{N_t\times}^7, \Pi \cdot W_{N_t\times}^{10},$ $\Pi \cdot W_{N_t\times}^{11},$ |

Rank-3 Codebook

According to one embodiment of the present invention, 4Tx rank-3 codebook design is approached in two viewpoints.

(1) Viewpoint of Antenna Power Balance

A most feasible type of 4Tx rank-3 codebook is explained as follows. First of all, the zero vector/matrix shown in Table 3 is usable for antenna group separation.

$$W_{N_t \times 3}^n \in \begin{bmatrix} \overline{v}_i & \overline{z} & \overline{v}_k \\ \overline{z} & \overline{v}_j & \overline{z} \end{bmatrix} \text{ or } \begin{bmatrix} \overline{v}_i & \overline{z} & \overline{z} \\ \overline{z} & \overline{v}_j & \overline{v}_k \end{bmatrix} \quad \text{[Formula 5]}$$

It is able to consider a matrix type that is normalized by multiplying the precoding matrix type of Formula 5 by a same scaling coefficient. In this case, i, j, k can include independent numbers, respectively. Physical antenna permutation (e.g., $\Pi \cdot W_{N_t \times 3}{}^n$), virtual antenna permutation (e.g., $W_{N_t \times 3}{}^n \cdot \Theta$), and total permutation (e.g., $\Pi \cdot W_{N_t \times 3}{}^n \cdot \Theta$) can be applied to the rank-3 codebook in the same manner of the rank-2 codebook. And, virtual antenna permutation $\Theta$ can be prescribed as follows.

TABLE 34

| $\Theta$ | | |
|---|---|---|
| $\Theta_1$ | $\Theta_2$ | $\Theta_3$ |
| $\begin{bmatrix} 1 & 0 & 0 \\ 0 & 0 & 1 \\ 0 & 1 & 0 \end{bmatrix}$ | $\begin{bmatrix} 0 & 1 & 0 \\ 1 & 0 & 0 \\ 0 & 0 & 1 \end{bmatrix}$ | $\begin{bmatrix} 0 & 1 & 0 \\ 0 & 0 & 1 \\ 1 & 0 & 0 \end{bmatrix}$ |
| $\Theta_4$ | $\Theta_5$ | |
| $\begin{bmatrix} 0 & 0 & 1 \\ 1 & 0 & 0 \\ 0 & 1 & 0 \end{bmatrix}$ | $\begin{bmatrix} 0 & 0 & 1 \\ 0 & 1 & 0 \\ 1 & 0 & 0 \end{bmatrix}$ | |

Yet, one preferred embodiment of the present invention proposes that a precoding matrix of a following type, which enables perfect power balance per antenna, is included in a rank-3 codebook.

$$W_{N_t \times 3}^n = \begin{bmatrix} \overline{v}_i & \overline{z} & \overline{v}_k \\ \overline{z} & \overline{v}_j & \overline{v}_l \end{bmatrix} \quad \text{[Formula 6]}$$

In Formula 6, i, j and k can be arbitrary independent indexes in Table 2 or Table 3, respectively. According to one embodiment of the present invention, if a normalization coefficient for $\overline{v}_i$ and $\overline{v}_j$ is set to $1/\sqrt{\alpha}$ and a normalization coefficient for $\overline{v}_k$ and the $\overline{v}_l$ is set to $1/\sqrt{\beta}$, the two coefficients can differ from each other. For instance, if $\alpha = 2\beta$, it is able to simultaneously match power balance per layer and power balance per antenna both.

If it is set to $\alpha = \beta$, it becomes a precoding matrix of a type that matches the power balance per antenna only. In this case, Formula 6 can be represented as follows.

$$W_{N_t \times 3}^n = \frac{1}{\sqrt{\delta}} \begin{bmatrix} \overline{v}_i & \overline{z} & \overline{v}_k \\ \overline{z} & \overline{v}_j & \overline{v}_l \end{bmatrix} \quad \text{[Formula 7]}$$

According to the present embodiment, physical antenna permutation (e.g., $\Pi \cdot W_{N_t \times 3}{}^n$), virtual antenna permutation (e.g., $W_{N_t \times 3}{}^n \cdot \Theta$), and total permutation (e.g., $\Pi \cdot W_{N_t \times 3}{}^n \cdot \Theta$) can be applied in the same manner of the rank-2 codebook. And, virtual antenna permutation $\Theta$ can be prescribed as Table 34.

In the precoding matrix type represented by Formula 6 or Formula 7, $\overline{v}_i$ and $\overline{v}_k$ are preferably orthogonal to each other. And, $\overline{v}_j$ and $\overline{v}_l$ are preferably orthogonal to each other as well.

An example for a rank-3 precoding matrix, which meets the above-mentioned conditions, can be represented as follows.

$$W_{N_t \times 3}^n = \begin{bmatrix} 1 & 0 & 1 \\ e^{j\theta_1} & 0 & -e^{j\theta_1} \\ 0 & 1 & 1 \\ 0 & e^{j\theta_2} & -e^{j\theta_2} \end{bmatrix} \text{ or } \quad \text{[Formula 8]}$$

$$W_{N_t \times 3}^n = \begin{bmatrix} 1 & 0 & 1 \\ -e^{j\theta_1} & 0 & e^{j\theta_1} \\ 0 & e^{j\theta_2} & e^{j\theta_2} \\ 0 & -e^{j\theta_3} & e^{j\theta_3} \end{bmatrix}$$

Of course, a rank-3 codebook includes a type generated from multiplying the type of Formula 8 by a normalization coefficient. In this case, $N_t$ is 4, $\theta_1$, $\theta_2$ meets the condition of $$\theta_2 \in \left\{ \frac{2\pi}{N} i, i = 0, \ldots, N-1 \right\},$$

and N is 4 or 8.

Moreover, it is able to consider a type generated from multiplying Formula 8 by one of various permutations. Theses types can be represented as follows.

$$\prod \cdot W_{N_t \times 3}^n = \prod \cdot \begin{bmatrix} 1 & 0 & 1 \\ e^{j\theta_1} & 0 & -e^{j\theta_1} \\ 0 & 1 & 1 \\ 0 & e^{j\theta_2} & -e^{j\theta_2} \end{bmatrix} \text{ or } \quad \text{[Formula 9]}$$

$$\prod \cdot \begin{bmatrix} 1 & 0 & 1 \\ -e^{j\theta_1} & 0 & e^{j\theta_1} \\ 0 & e^{j\theta_2} & e^{j\theta_2} \\ 0 & -e^{j\theta_3} & e^{j\theta_3} \end{bmatrix}$$

$$\prod \cdot W_{N_t \times 3}^n \cdot \Theta = \prod \cdot \begin{bmatrix} 1 & 0 & 1 \\ e^{j\theta_1} & 0 & -e^{j\theta_1} \\ 0 & 1 & 1 \\ 0 & e^{j\theta_2} & -e^{j\theta_2} \end{bmatrix} \cdot \Theta \quad \text{[Formula 10]}$$

$$W_{N_t \times 3}^n \cdot \Theta = \begin{bmatrix} 1 & 0 & 1 \\ e^{j\theta_1} & 0 & -e^{j\theta_1} \\ 0 & 1 & 1 \\ 0 & e^{j\theta_2} & -e^{j\theta_2} \end{bmatrix} \cdot \Theta$$

$$= \prod \cdot \begin{bmatrix} 1 & 0 & 1 \\ -e^{j\theta_1} & 0 & e^{j\theta_1} \\ 0 & e^{j\theta_2} & e^{j\theta_2} \\ 0 & -e^{j\theta_3} & e^{j\theta_3} \end{bmatrix} \cdot \Theta$$

$$W_{N_t \times 3}^n \cdot \Theta = \begin{bmatrix} 1 & 0 & 1 \\ -e^{j\theta_1} & 0 & e^{j\theta_1} \\ 0 & e^{j\theta_2} & e^{j\theta_2} \\ 0 & -e^{j\theta_3} & e^{j\theta_3} \end{bmatrix} \cdot \Theta$$

(2) CM Property Maintaining Viewpoint

If MIMO is applied to uplink signal transmission, it may cause such a problem that a power amplifier of high performance raises a cost of a user equipment. And, PAPR/CM property of the uplink signal transmission is more important than that of downlink signal transmission. Therefore, a codebook structure for maintaining a good PAPR/CM property needs to be taken into consideration.

PAPR (peak power to average power ratio) is a parameter that indicates a property of waveform. This value results from dividing a peak amplitude of waveform by a time-averaged RMS (root mean square) value of the waveform and is a dimensionless value. Normally, a PAPR of a single carrier signal is better than that of a multi-carrier signal.

In LTE-Advanced, it is able to implement MIMO (multiple input multiple output) using SC-FDMA (single carrier-frequency division multiple access) to maintain a good CM property. If general precoding is used, a signal carrying information corresponding to several layers is multiplexed and transmitted via a single antenna, the signal transmitted via this antenna can be regarded as a sort of multi-carrier signal. PAPR is associated with a dynamic range a power amplifier in a transmitting side should support. And, a CM (cubic metric) value is another numerical value indicating a numerical value represented by the PAPR.

In order to maintain the above-mentioned good PAPR/CM property for the uplink signal transmission, a combined type of SC-FDMA and MIMO is preferably taken into consideration.

Figure 3:
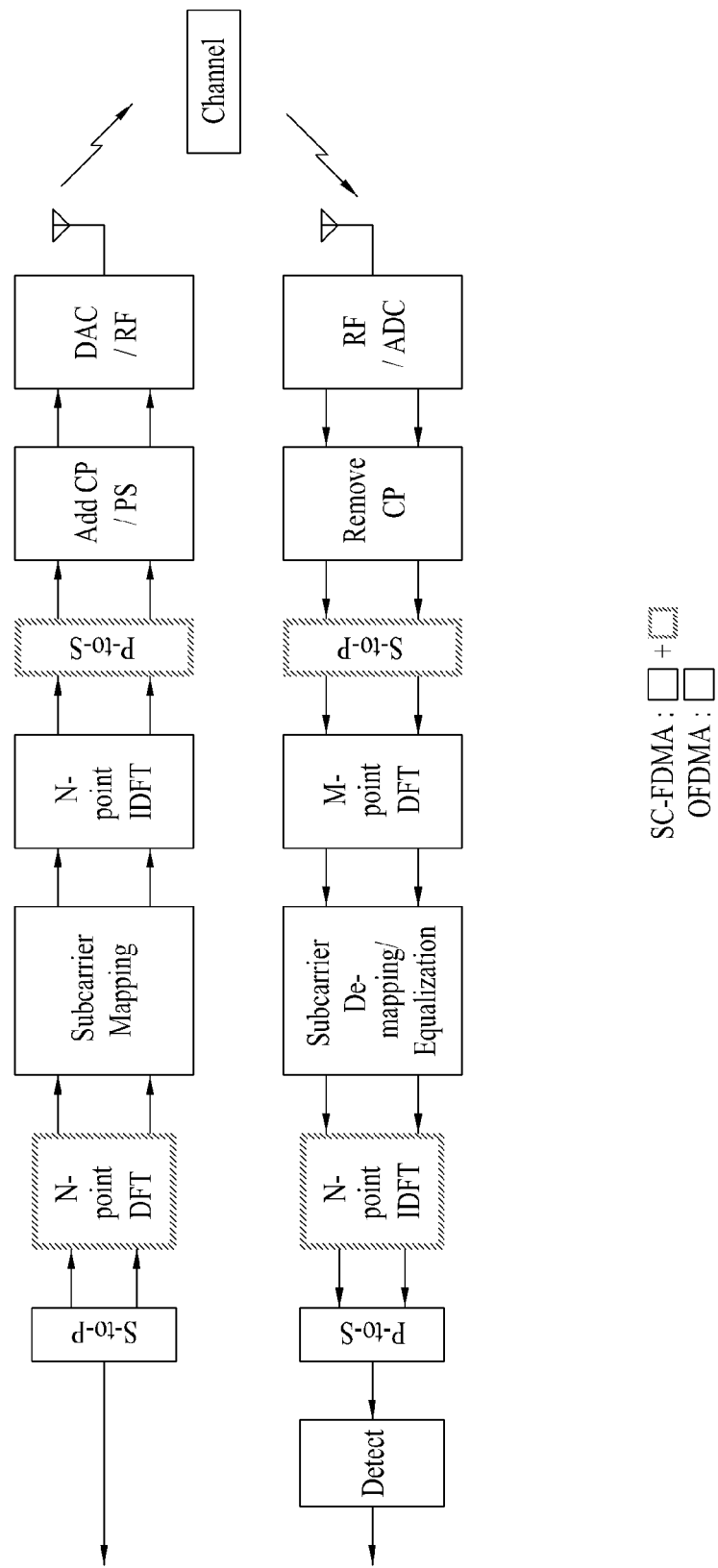
FIG. 3 is a diagram for explaining general SC-FDMA.

FIG. 3 is a diagram for explaining general SC-FDMA.

Referring to FIG. 3, in both OFDM and SC-FDMA schemes, a serial signal is converted to a parallel signal, the parallel signal is mapped by a subcarrier, IDFT or IFFT is performed thereon, the signal is converted to a serial signal again, a CP is attached to the serial signal, and the corresponding signal is then transmitted via an RF module. Yet, the SC-FDMA scheme is characterized in reducing influence of IDFT or IFFT processing through DFP spreading after conversion to a serial signal from a parallel signal and maintaining a single signal property over a predetermined level.

When MIMO is applied to this SC-FDMA signal transmission, a processor configuration of a user equipment is explained as follows.

Figure 4:
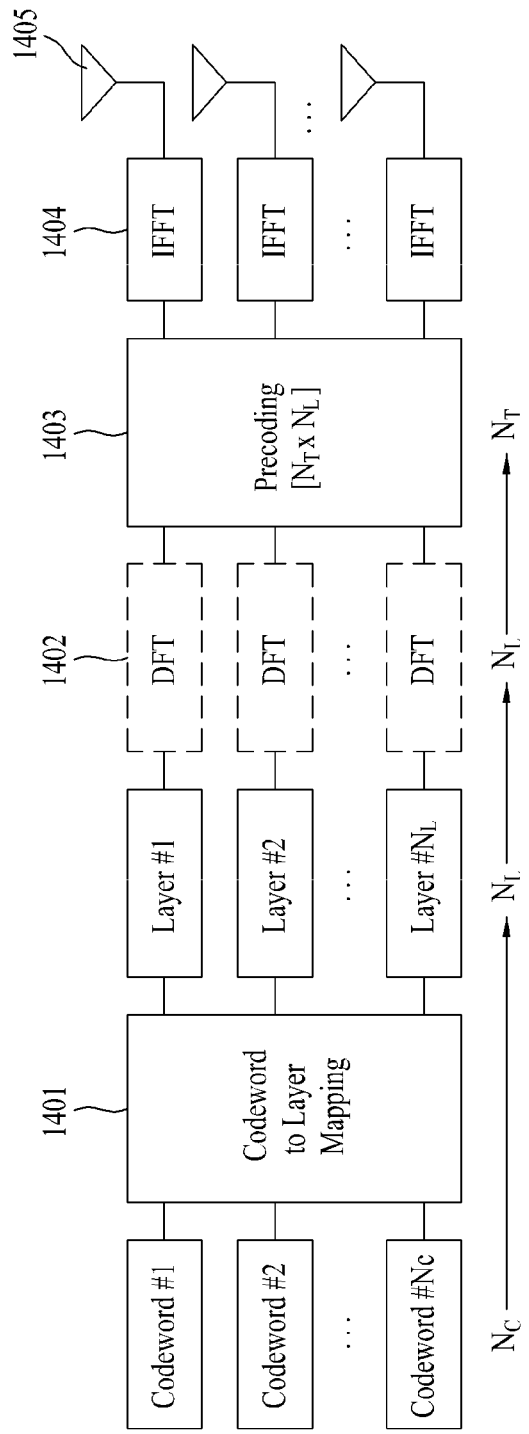
FIG. 4 is a diagram for detailed configuration of a processor of a user equipment according to one embodiment of the present invention.

FIG. 4 is a diagram for detailed configuration of a processor of a user equipment according to one embodiment of the present invention.

Referring to FIG. 4, a processor of a user equipment according to one embodiment of the present invention includes a layer mapper 1401 mapping an uplink signal by layers of which number corresponding to a specific rank, a prescribed number of DFT modules 1402 performing DFT (discrete Fourier transform) spreading on a prescribed number of layer signals, and a precoder 1403 performing precoding on a transmission signal by selecting a precoding matrix from a codebook stored in a memory 22. The DFT module 1402 for transmitting an uplink signal by SC-FDMA, as shown in FIG. 4, is arranged in front of the precoder 1403 and in rear of the layer mapper 1401. The DFT-spread signal per layer passes through the precoding and is then transmitted by being IFFT inverse-spread. Therefore, it is able to maintain a good PAPR/CM property due to the cancellation effect between DFT spreading and IFFT inverse spreading.

According to one embodiment of the present invention, proposed is a method of designing a rank-3 codebook to maintain an optimal PAPR/CM property in a manner that each row of a precoding matrix is made to include one component except 0 only. In case of using such a precoding matrix including one component except 0 in each row, a plurality of data symbols are not combined with each antenna port. Therefore, it is able to maintain a good CM property. Moreover, as mentioned in the foregoing description with reference to FIG. 4, if one layer signal is set to be transmitted via one antenna in performing precoding after DFT spreading, it is able to directly cancel the effect of IFFT inverse spreading by DFT spreading.

A precoding matrix of a rank-3 codebook according to the present embodiment can be represented as follows.

$$W_{N_t \times 3}^n = \begin{bmatrix} 1 & 0 & 0 \\ 0 & 1 & 0 \\ 0 & 0 & 1 \\ 0 & 0 & e^{j\theta} \end{bmatrix} \quad \text{[Formula 11]}$$

Of course, the rank-3 codebook can include a type that the above type represented by Formula 11 is multiplied by a normalization coefficient. In Formula 11, $N_t$ is 4, $\theta$ meets the condition of $$\theta \in \left\{ \frac{2\pi}{N} i, i = 0, \ldots, N-1 \right\};$$

and N is 4 or 8.

A precoding matrix according to the present embodiment can have various permutation types as follows.

$$\prod \cdot W_{N_t \times 3}^n = \prod \cdot \begin{bmatrix} 1 & 0 & 0 \\ 0 & 1 & 0 \\ 0 & 0 & 1 \\ 0 & 0 & e^{j\theta} \end{bmatrix} \quad \text{[Formula 12]}$$

$$\prod \cdot W_{N_t \times 3}^n \cdot \Theta = \prod \cdot \begin{bmatrix} 1 & 0 & 0 \\ 0 & 1 & 0 \\ 0 & 0 & 1 \\ 0 & 0 & e^{j\theta} \end{bmatrix} \cdot \Theta \text{ or} \quad \text{[Formula 13]}$$

$$W_{N_t \times 3}^n \cdot \Theta = \begin{bmatrix} 1 & 0 & 0 \\ 0 & 1 & 0 \\ 0 & 0 & 1 \\ 0 & 0 & e^{j\theta} \end{bmatrix} \cdot \Theta$$

In case of the precoding matrixes represented as Formulas 11 to 13, either antenna power balancing or layer power balancing can be performed. And, it is unable to simultaneously perform both of the antenna power balancing and the layer power balancing.

In viewpoint of CM property, the precoding matrixes shown in Formulas 7 to 10 can be regarded as matrixes for maintaining a good CM property in apart. Regarding the precoding matrixes shown in Formulas 7 to 10, two non-zero components are included in each row. Comparing the precoding matrixes shown in Formulas 7 to 10 to a precoding matrix, in which every component has a constant modulus, since two symbols are combined per antenna, it can be regarded as maintaining a good CM property.

Meanwhile, according to one preferred embodiment of the present invention for 4Tx rank-3 codebook, proposed is a combined type codebook, which includes a precoding matrix of an antenna power balance considered type as a first type precoding matrix and a precoding matrix of a type including one non-zero component in one row as a second type precoding matrix, for using both of the first and second type precoding matrixes.

It is understood that the above-mentioned embodiments of the rank-1, rank-2 and rank-3 of the 4Tx antenna codebook are usable by being combined into a type including a prescribed number of precoding matrixes per rank in one codebook.

In the following description, a base station and a user equipment, which use the above described codebook, are explained.

Figure 5:
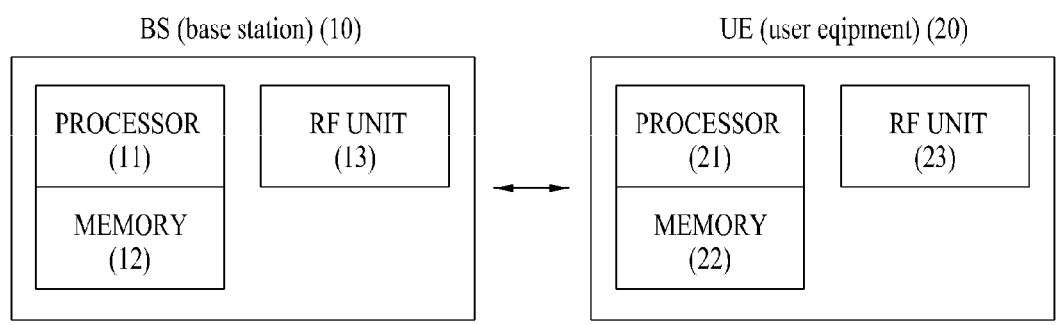
FIG. 5 is a diagram for configurations of a base station and a user equipment.

FIG. 5 is a diagram for configurations of a base station and a user equipment.

Referring to FIG. 5, a base station 10 can include a processor 11, a memory 12 and an RF module 13 as a transceiving module for performing a reception of an uplink signal and a transmission of a downlink signal. The processor 11 of the base station 10 controls the downlink signal transmission using information, which is stored in the memory 12 for the downlink signal transmission, e.g., a specific precoding matrix within a codebook for the downlink signal transmission. And, the processor 11 of the base station 10 is able to control the downlink signal reception using information stored in the memory 12 for the uplink signal reception. For instance, the processor 11 is able to control a signal receiving process for multiplying an uplink signal by Hermitian matrix of the same precoding matrix used by a user equipment 20 as a reverse process of precoding. The memory 12 of the base station 10 according to the present embodiment is proposed to store the above-mentioned codebook as an uplink 4Tx codebook. Moreover, a functionality module for performing a precoding relevant function of the processor 11 can be separately configured with a precoder (not shown in the drawing).

The user equipment 20 can include a processor 21, a memory 22 and an RF module 23 as a transceiving module for performing a transmission of an uplink signal and a reception of a downlink signal. The processor 21 controls the uplink signal transmission using information, which is stored in the memory 22 for the uplink signal transmission, e.g., a specific precoding matrix within a codebook for the uplink signal transmission, as mentioned in the foregoing description of the embodiment for the uplink signal transmission. And, the processor 21 is able to control the downlink signal reception using information stored in the memory 22 for the downlink signal reception. For instance, the processor 21 is able to control a signal receiving process for multiplying an uplink signal by Hermitian matrix of the same precoding matrix used by the base station 10 as a reverse process of precoding. The memory 22 of the user equipment 20 according to the present embodiment is proposed to store the above-mentioned codebook as an uplink 4Tx codebook. Moreover, the detailed configuration of the processor 21 can have the former configuration described with reference to FIG. 4.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

Accordingly, the above description is mainly made with reference to a case of a follow-up model of 3GPP LTE system, e.g., a case of 3GPP LTE-A system. And, the present invention is a next generation mobile communication technology and is applicable to IEEE series or systems according to other standards by the same principle.

What is claimed is:

1. A method of transmitting a signal, which is transmitted to a base station by a user equipment configured to use 4 antennas, the method comprising:
    obtaining transmission rank information;
    outputting a precoded signal by precoding a number of layer signals, the number corresponding to a transmission rank included in the transmission rank information, using a specific precoding matrix corresponding to the transmission rank, wherein the specific precoding matrix is selected from a 4-antenna codebook; and
    transmitting the precoded signal to the base station,
    wherein the 4 antennas are grouped into a first antenna group including two of the 4 antennas and a second antenna group including the other two of the 4 antennas, and
    wherein the 4-antenna codebook includes a first type precoding matrix, in which two components corresponding to one of the first and second antenna groups are zero and two components corresponding to the other one of the first and second antenna groups construct a discrete Fourier transform (DFT) matrix, and a second type precoding matrix, in which two components corresponding to the first antenna group and two components corresponding to the second antenna group construct DFT matrixes for a rank of 1.

2. The method of claim 1, wherein the first type precoding matrix is an antenna group selection matrix and wherein the second type precoding matrix is a DFT matrix.

3. The method of claim 1, wherein the second type precoding matrix includes a code in which the two components corresponding to the first antenna group and the two components corresponding to the second antenna group are mutually orthogonal.

4. The method of claim 1, wherein the 4-antenna codebook further includes a precoding matrix, in which two components corresponding to either the first antenna group or the second antenna group are 0 in a first column and two components corresponding to either the second antenna group or the first antenna group are 0 in a second column, for a rank of 2.

5. The method of claim 4, wherein the 4-antenna codebook further includes at least one selected from the group consisting of a precoding matrix for performing a layer swapping function of changing positions of two layer signals and an antenna permutation precoding matrix for changing a position of an antenna, for the rank of 2.

6. The method of claim 1, wherein each of the first type precoding matrix and the second type precoding matrix is a precoding matrix multiplied by a same constant.

7. The method of claim 6, wherein the first type precoding matrix is configured to transmit the precoded signal to the base station using ½ of a maximum available transmission power of the user equipment.

8. A method of transmitting a signal, which is transmitted to a base station by a user equipment configured to use 4 antennas grouped into a first antenna group including two of the 4 antennas and a second antenna group including the other two of the 4 antennas, the method comprising:
    turning off the first antenna group in a specific situation; and
    transmitting the signal to the base station via the second antenna group,
    wherein turning off the first antenna group is performed by precoding using a rank-1 precoding matrix, and wherein the rank-1 precoding matrix includes a precoding matrix, in which two components corresponding to the first antenna group are zero and two components corresponding to the second antenna group construct a discrete Fourier transform (DFT) matrix.

9. A method of receiving a signal, which is received by a base station from a user equipment configured to use 4 antennas, the method comprising:
receiving a reception signal from the user equipment;
obtaining a transmission rank and precoding matrix identification information used by the user equipment for the reception signal; and
performing reverse processing of precoding on the reception signal using a specific precoding matrix corresponding to the transmission rank and precoding matrix identification information selected from a 4-antenna codebook,
wherein the 4 antennas are grouped into a first antenna group including two of the 4 antennas and a second antenna group including the other two of the 4 antennas, and
wherein the 4-antenna codebook includes a first type precoding matrix, in which two components corresponding to one of the first and second antenna groups are zero and two components corresponding to the other one of the first and second antenna groups construct a discrete Fourier transform (DFT) matrix, and a second type precoding matrix, in which two components corresponding to the first antenna group and two components corresponding to the second antenna group construct DFT matrixes for a rank of 1.

10. The method of claim 9, wherein the first type precoding matrix is an antenna group selection matrix and the second type precoding matrix is a DFT matrix.

11. The method of claim 9, wherein the 4-antenna codebook further includes a precoding matrix, in which two components corresponding to either the first antenna group or the second antenna group are 0 in a first column and two components corresponding to either the second antenna group or the first antenna group are 0 in a second column, for a rank of 2.

12. A user equipment in a wireless communication system, comprising:
a first antenna group including a first antenna and a second antenna;
a second antenna group including a third antenna and a fourth antenna;
a memory configured to store a 4-antenna codebook including a first type precoding matrix, in which two components corresponding to one of the first and second antenna groups are zero and two components corresponding to the other one of the first and second antenna groups construct a discrete Fourier transform (DFT) matrix, and a second type precoding matrix, in which two components corresponding to the first antenna group and two components corresponding to the second antenna group construct DFT matrixes for a rank of 1; and
a precoder outputting a precoded signal by precoding a number of layer signals, the number corresponding to a transmission rank, using a specific precoding matrix corresponding to the transmission rank, wherein the specific precoding matrix is selected from the 4-antenna codebook stored in the memory,
wherein the precoded signal is transmitted to a base station via at least the first antenna group or the second antenna group.

13. The user equipment of claim 12, wherein the first type precoding matrix is an antenna group selection matrix and the second type precoding matrix is a DFT matrix.

14. The user equipment of claim 12, wherein the second type precoding matrix includes a code in which the two components corresponding to the first antenna group and the two components corresponding to the second antenna group are mutually orthogonal.

15. The user equipment of claim 12, wherein the 4-antenna codebook further includes a precoding matrix, in which two components corresponding to either the first antenna group or the second antenna group are 0 in a first column and two components corresponding to either the second antenna group or the first antenna group are 0 in a second column, for a rank of 2.

16. The user equipment of claim 15, wherein the 4-antenna codebook further includes at least one selected from the group consisting of a precoding matrix for performing a layer swapping function of changing positions of two layer signals and an antenna permutation precoding matrix for changing a position of an antenna, for the rank of 2.

17. The user equipment of claim 12, wherein each of the first type precoding matrix and the second type precoding matrix is a precoding matrix multiplied by a same constant.

18. The user equipment of claim 17, wherein the first type precoding matrix is configured to transmit the precoded signal to the base station using ½ of a maximum available transmission power of the user equipment.

19. A user equipment comprising:
a first antenna group including a first antenna and a second antenna;
a second antenna group including a third antenna and a fourth antenna;
a memory configured to store a 4-antenna codebook including a precoding matrix to turn off the first antenna group for a rank of 1; and
a precoder outputting a precoded signal by precoding a transmission signal using the precoding matrix,
wherein the precoded signal is transmitted to a base station via the first antenna group, and
wherein the precoding matrix includes two components corresponding to the first antenna group that are zero and another two components corresponding to the second antenna group that construct a discrete Fourier transform (DFT) matrix.

20. A base station comprising:
an antenna configured to receive a reception signal transmitted from a user equipment configured to transmit a signal using 4 antennas grouped into a first antenna group including two of the 4 antennas and a second antenna group including the other two of the 4 antennas;
a memory configured to store a 4-antenna codebook including a first type precoding matrix, in which two components corresponding to one of the first and second antenna groups are zero and two components corresponding to the other one of the first and second antenna groups construct a discrete Fourier transform (DFT) matrix, and a second type precoding matrix, in which two components corresponding to the first antenna group and two components corresponding to the second antenna group construct DFT matrixes for a rank of 1; and
a precoder performing reverse processing of precoding on the reception signal by using a specific precoding matrix corresponding to a transmission rank and precoding matrix identification information used by the user equipment, wherein the specific precoding matrix is selected from the 4-antenna codebook.

21. The base station of claim 20, wherein the 4-antenna codebook further includes a precoding matrix, in which two components corresponding to either the first antenna group or the second antenna group are 0 in a first column and two components corresponding to either the second antenna group or the first antenna group are 0 in a second column, for a rank of 2.

* * * * *